United States Patent
Leverty

(10) Patent No.: US 7,530,351 B2
(45) Date of Patent: May 12, 2009

(54) PELLET BURNING HEATING ASSEMBLY

(76) Inventor: Patrick A. Leverty, 2163 State Highway 200 NE., Boy River, MN (US) 56672

( * ) Notice: Subject to any disclaimer, the term of this patent is extended or adjusted under 35 U.S.C. 154(b) by 0 days.

(21) Appl. No.: 11/899,705

(22) Filed: Sep. 7, 2007

(65) Prior Publication Data

US 2008/0060632 A1 Mar. 13, 2008

Related U.S. Application Data

(60) Provisional application No. 60/843,447, filed on Sep. 7, 2006.

(51) Int. Cl.
*F24B 7/00* (2006.01)
(52) U.S. Cl. .............. 126/7; 126/10; 126/11; 126/77; 110/293
(58) Field of Classification Search .......... 126/7, 126/10, 11, 25 R, 163 A, 146, 112, 501, 77, 126/58; 110/104 B, 105, 108, 293, 294, 110/254
See application file for complete search history.

(56) References Cited

U.S. PATENT DOCUMENTS

| | | | |
|---|---|---|---|
| 4,782,765 A | 11/1988 | Miller et al. | |
| 4,823,684 A | 4/1989 | Traeger et al. | |
| 4,867,050 A | 9/1989 | Patenaude et al. | |
| 4,989,521 A | 2/1991 | Traeger et al. | |
| 5,001,993 A * | 3/1991 | Gramlow | 110/233 |
| 5,144,939 A | 9/1992 | Christopherson | |
| 5,183,028 A | 2/1993 | Traeger et al. | |
| 5,251,607 A | 10/1993 | Traeger et al. | |
| 5,285,738 A | 2/1994 | Cullen | |
| 5,429,110 A | 7/1995 | Burke et al. | |
| D377,391 S | 1/1997 | Whitehurst, Sr. | |

(Continued)

OTHER PUBLICATIONS

Biomass Energy Foundation, "Woodgas History", web page, Nov. 5, 2001.

*Primary Examiner*—Alfred Basichas
(74) *Attorney, Agent, or Firm*—Anthony G. Eggink; Katrina M. Eggink

(57) ABSTRACT

A portable pellet fired heating element for mounting to a grill or stove and comprising a gravity fed pellet holder, a unitary tubular structure having a burner, an air intake and an exhaust chute. Fuel may be supplied to the pellet holder by various supply means such as a conveyer, ramp, scooped, held in bulk in a hopper, and like pellet supply structures and methods. Fuel is fed to the air-cooled insulated burner area onto a decomposer grate, which defines the primary combustion area and which is partially open to the atmosphere for air intake. An adjustable high-pressure flow of gas or vapor is introduced to the primary exhaust chute below the decomposer grate to create a low pressure flow above the grate and which upon ignition, cause flames to be pulled into the pellet mass on the grate. In operation, air from the primary air intake maintains hot charcoal in the primary combustion area, and the secondary combustion area provides a steady flow of wood gas that mixes with a predetermined or adjustable amount of air supplied by the secondary air intake to maintain the flame. The super heated gasses and any ash are provided to the grill or stove by means of the exhaust chute. For cleaning purposes, an electrical/mechanical device may be provided to move the decomposer grate or to provide a sudden burst of high gas pressure.

20 Claims, 18 Drawing Sheets

U.S. PATENT DOCUMENTS

| | | | |
|---|---|---|---|
| 5,893,358 A * | 4/1999 | Whitfield | 126/73 |
| 5,983,885 A | 11/1999 | Jarvi | |
| 6,223,737 B1 | 5/2001 | Buckner | |
| 6,336,449 B1 | 1/2002 | Drisdelle et al. | |
| 6,874,496 B2 | 12/2004 | Waits et al. | |

* cited by examiner

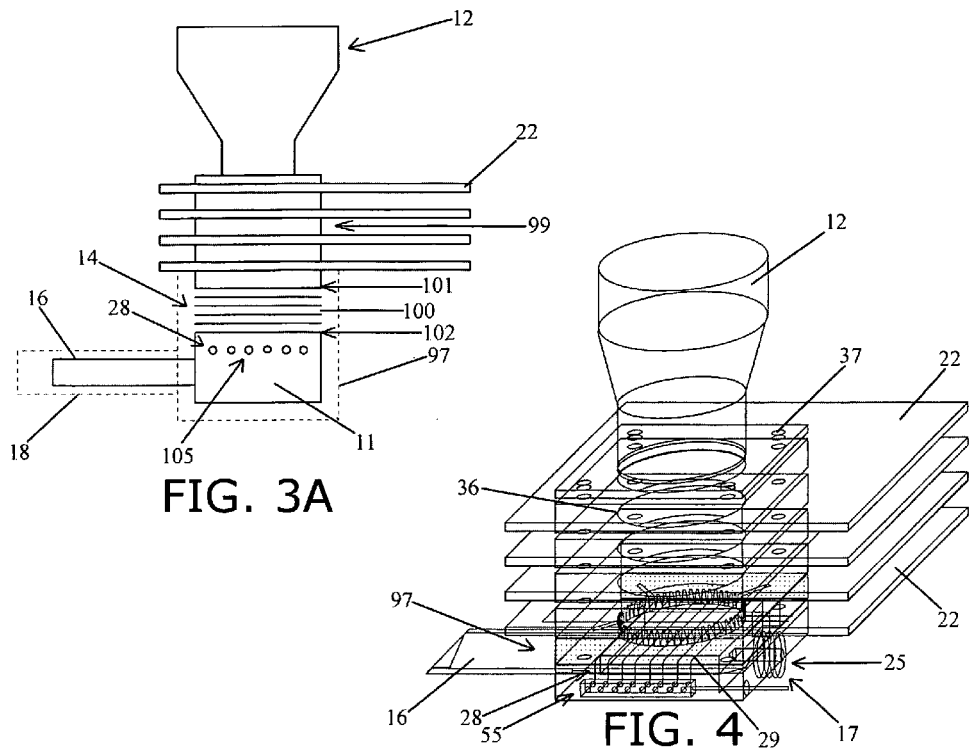
FIG. 3A
FIG. 4
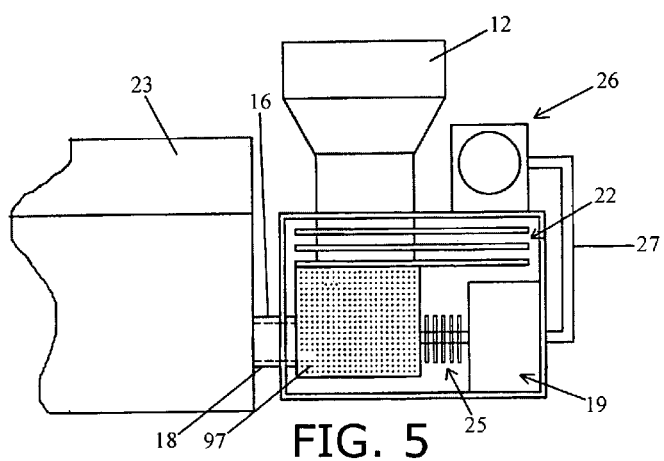
FIG. 5

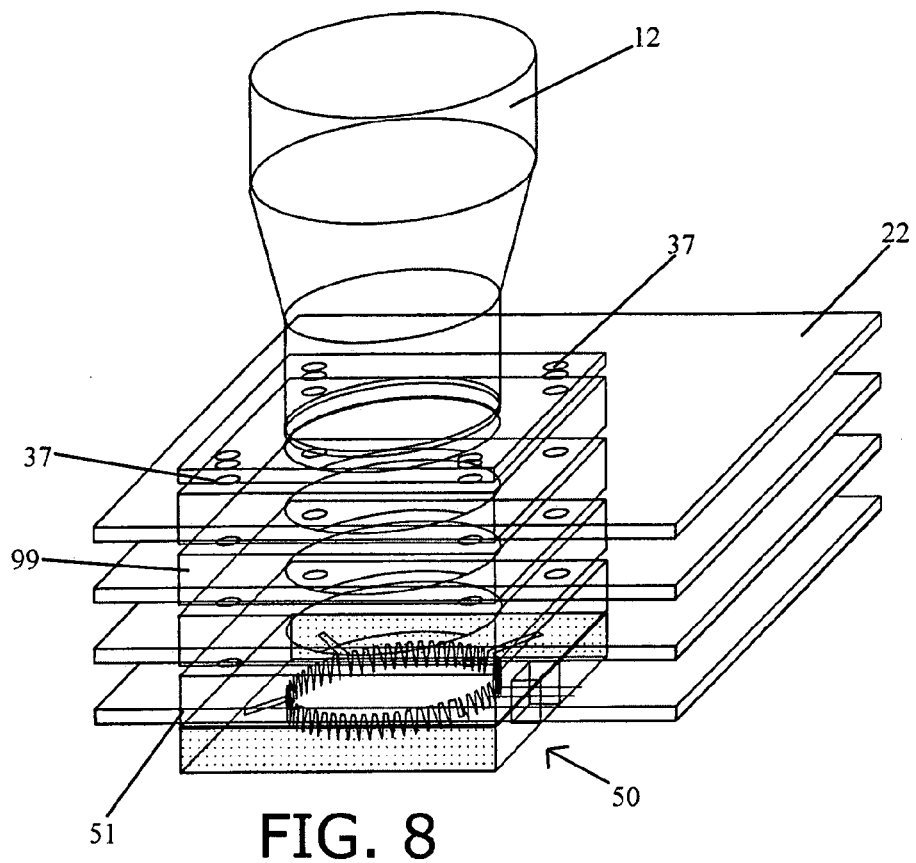
FIG. 8
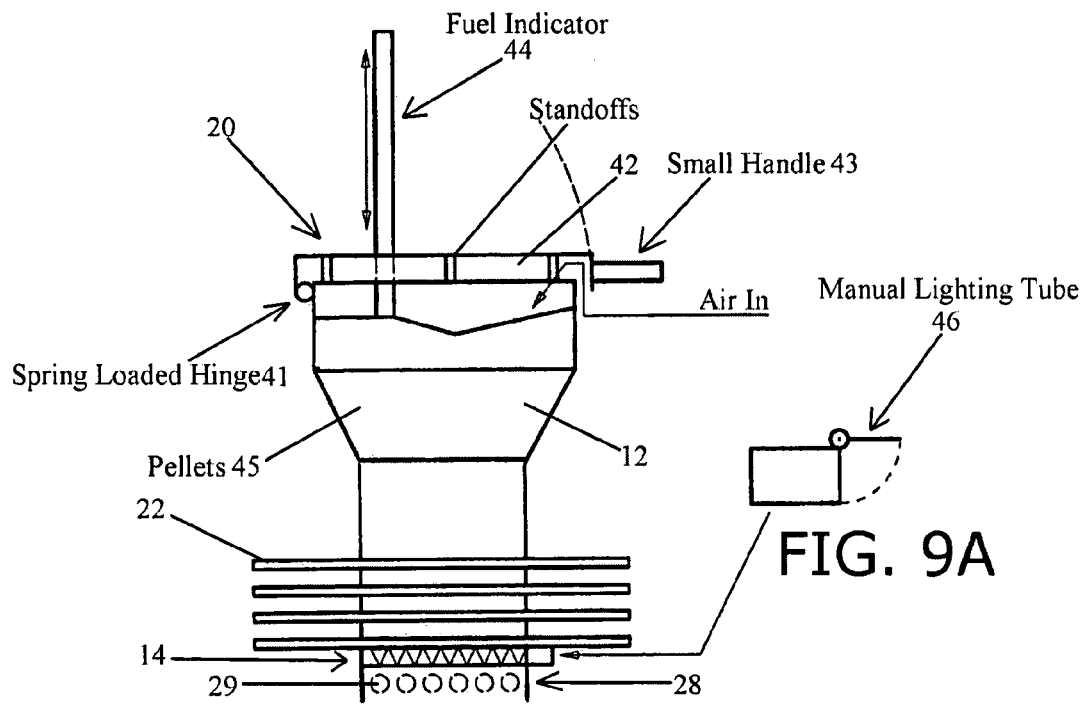
FIG. 9
FIG. 9A

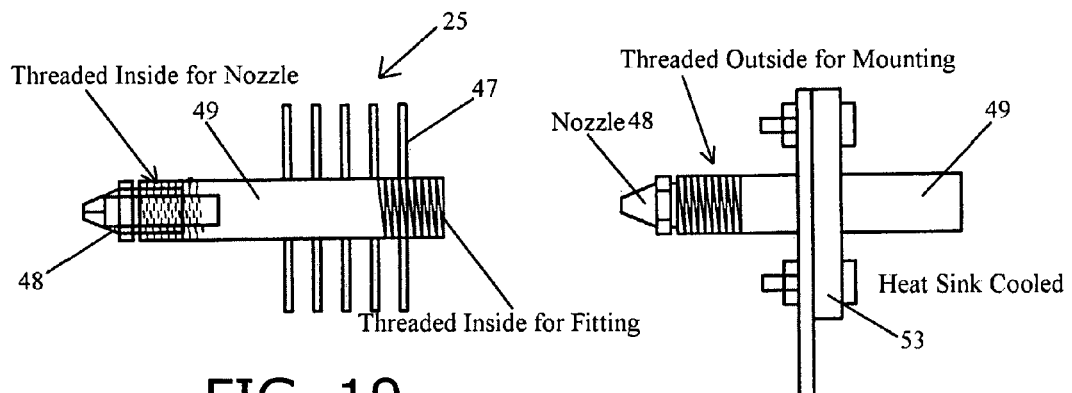
FIG. 19
FIG. 20
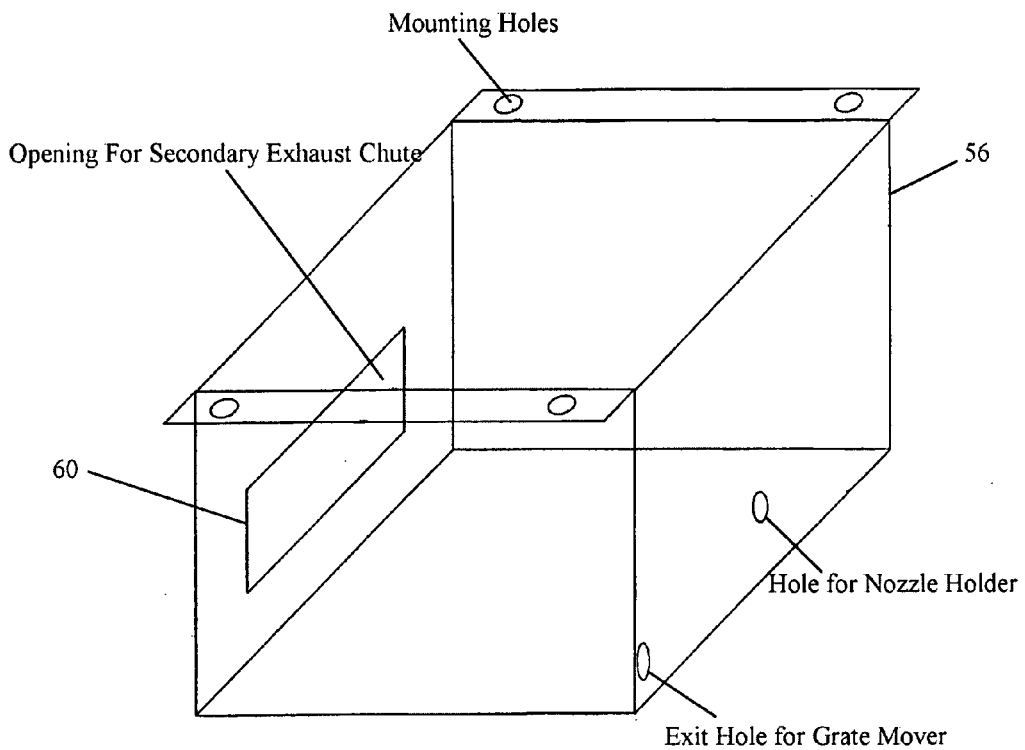
FIG. 21

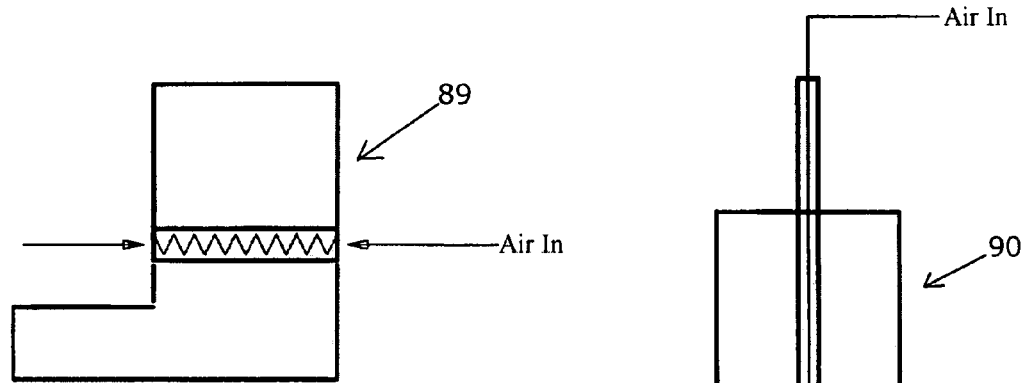
FIG. 40
FIG. 41
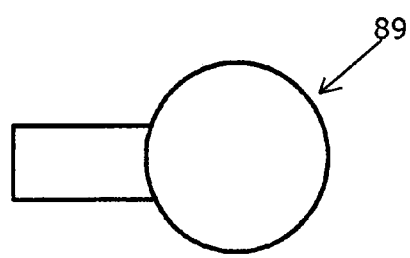
FIG. 42
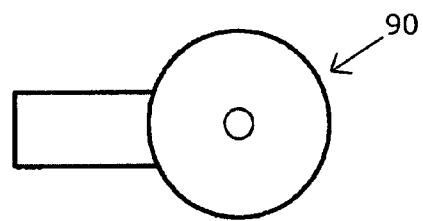
FIG. 43
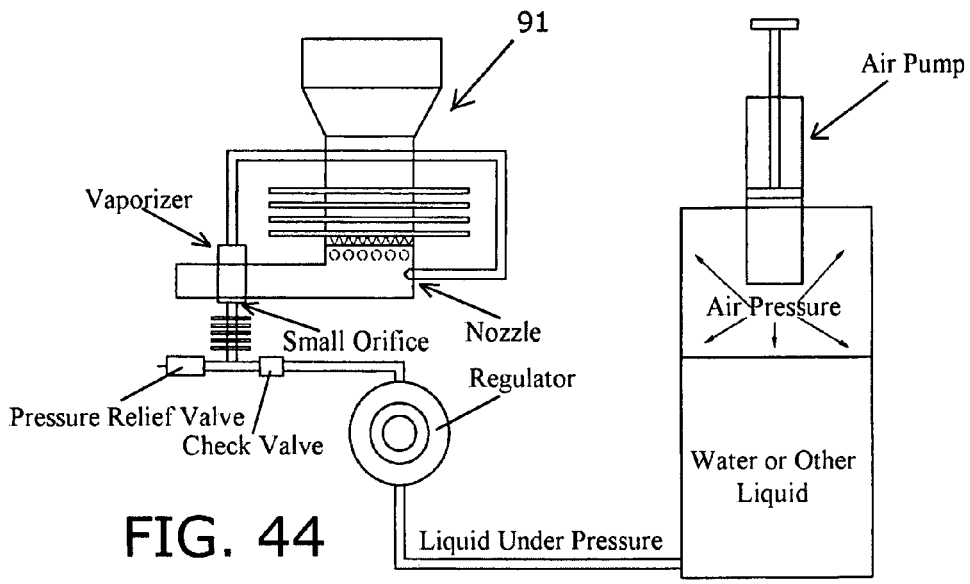
FIG. 44

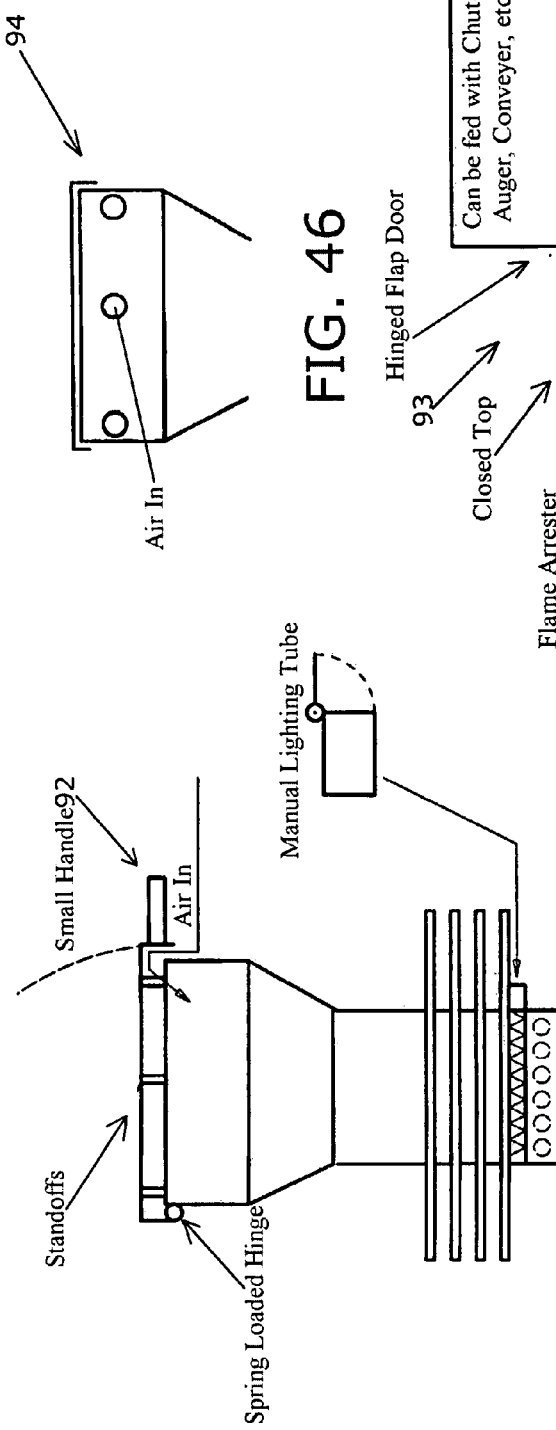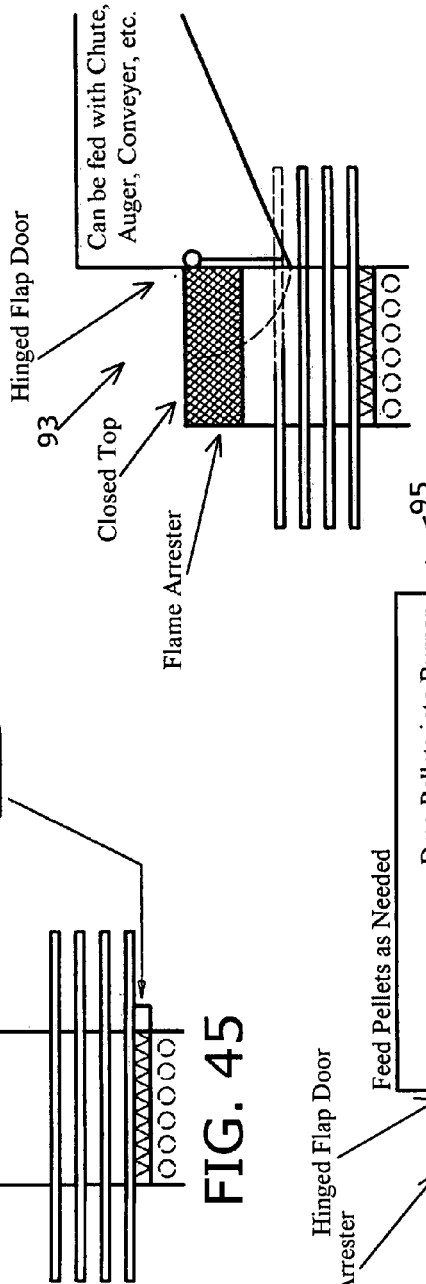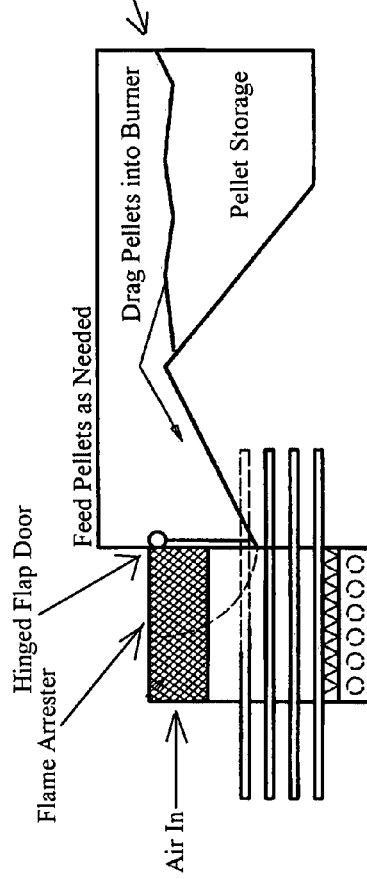

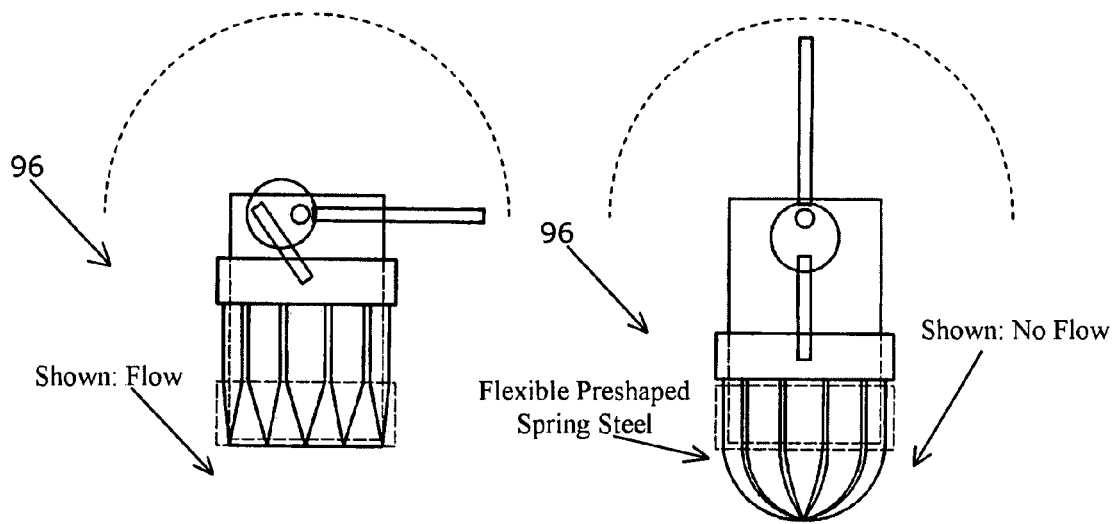
FIG. 48
FIG. 49
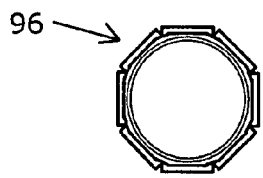
FIG. 48A
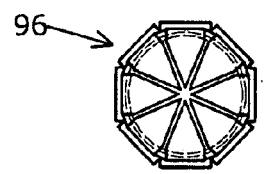
FIG. 49A
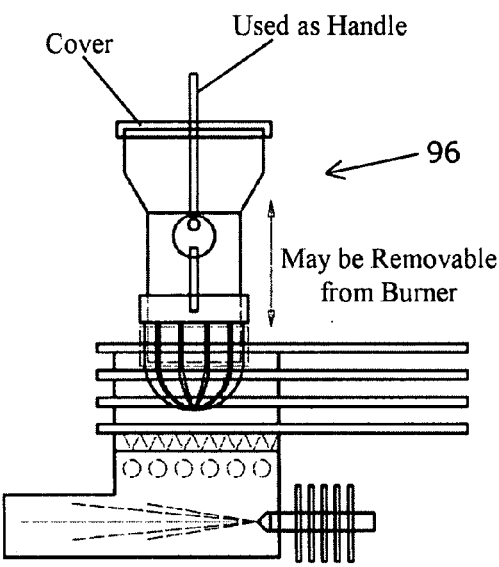
FIG. 50
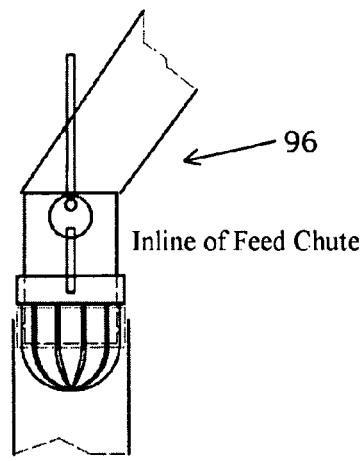
FIG. 51

PELLET BURNING HEATING ASSEMBLY

This application claims the benefit of U.S. Provisional Application Ser. No. 60/843,447, filed on Sep. 7, 2006.

BACKGROUND OF THE INVENTION

The present invention relates generally to a pellet burning heating assembly. More particularly, the invention relates to a portable and economic heating element for a heating assembly which is wood pellet-fired and constructed and arranged to be mounted to barbeque grills and stoves.

It can be appreciated that grills and stoves have been in use for many years. Typically, most prior art grills use charcoal briquettes, gas burners and the like as heat sources. These heat sources have certain advantages, disadvantages and limitations. Charcoal, for example, imparts desirable food flavors, however, it is expensive, messy, hard to handle, requires time to properly light and to reach proper temperature and after cooking is completed, the charcoal is usually left to burn itself out, thereby resulting in wasted fuel. Gas burners can also be expensive to operate and the storage tanks are heavy and bulky. Gas fuel has certain conveniences over charcoal briquettes, however, it does not provide any desirable flavor to the cooked food, as does a wood-based fire, which provides a smoke flavor into the foods being cooked.

Pelletized wood fuel has gained popularity for both home heating and for cooking purposes. However, prior art grills and stoves tend to be quite large and have components that become part of the grill or stove design. Most prior art assemblies, for example, incorporate the pellet area/hopper, blower, burner and auger assembly into the grill or stove structure. The parts of the grill or stove essentially dictate the stove or grill structure and design resulting in relatively massive sizes. Prior art pellet grills and stoves can also be very expensive and are not readily portable, due to their size and weight.

The present invention provides a new and novel way of burning pelletized fuel, reduces the size of the burner itself, and uses a gravity fed system to eliminate the need for an auger assembly and does not require a blower which can be bulky in size. The present invention is a relatively small, one-piece design which is efficient and effective.

Pelletized wood fuel is relatively inexpensive and easy to obtain and is sold with different flavor enhancing qualities such as hickory, mesquite, cherry, etc. Some grill companies suggest using flavored wood pellets as the main heat source of its grills, which is acceptable for slow cooking or smoking, however, when cooking at higher temperatures there is little or no smoke, the fuel is burned efficiently and will impart little or no smoke flavor. There is moisture being released from the burning pellets, which will impact the food, however it does not carry much of the smoke flavoring.

By adding a handful of flavoring pellets or wood chips to a smoke device, and using a common hardwood pellet as the main heat source further makes the present invention more efficient and economical. The common hardwood pellets will impart the moisture, the moisture will carry the smoke, the smoke and moisture will impart flavor to the food being cooked. For the purposes of the present invention, common hardwood pellets are recommended along with a smoke device and flavoring wood pellets or chips, in order to achieve the desired flavor at a much lower cost. For certain foods, a smoke flavor may not be desirable, and therefore not requiring the use of flavoring pellets.

SUMMARY OF THE INVENTION

A wood pellet burner assembly constructed and arranged for mounting to an existing grill or stove. The assembly has a unitary tubular structure, a pellet holder from which pellets are gravity fed through a convectively cooled and insulated region which direct the pellets downwardly to a primary combustion area. The primary combustion area has a primary air intake and a pellet decomposing region, which releasably contain decomposing pellets which once spent, are introduced to a secondary combustion area, having a secondary air intake, to further facilitate combustion. An exhaust tube communicates with the secondary combustion area and in which an adjustable or variable atmospheric pressure differential is generated or introduced, creating a low-pressure region to facilitate air flow to the primary and secondary air intakes to complete the combustion process. An electrical/mechanical device may be provided for movement of the decomposing region to facilitate ash removal, or alternatively, a burst of high gas pressure may be utilized.

The portable pellet heating element may comprise a unitary, generally L-shaped, tubular structure having a gravity fed pellet holder, a burner, an air intake and an exhaust chute. Fuel is supplied to the pellet holder by supply means, i.e., conveyer, ramp, scooped, held in bulk in a hopper, and like pellet supply structures and methods. Fuel is supplied to the air-cooled insulated burner area on a decomposer grate, which defines the primary combustion area and which is partially open to the atmosphere for air intake.

An adjustable high-pressure flow of gas or vapor is introduced to the primary exhaust chute. The high-pressure flow below the decomposer grate creates a low pressure flow on the top of the grate, which also creates a low pressure area so that upon ignition, flames are pulled into the pellet mass on the grate. During operation, air from the primary air intake maintains hot charcoal in the primary combustion area, and the secondary combustion area provides a steady flow of wood gas that mixes with a predetermined or adjustable amount of air supplied by the secondary air intake to maintain the flame. The super heated gasses and any ash are provided to the grill or stove by means of the exhaust chute. For cleaning purposes, an electrical/mechanical device may be provided to move the decomposer grate or to provide a sudden burst of high gas pressure.

The present invention incorporates a burner with a pellet holder for holding enough pellets to provide about ¾ of an hour run time, for example, and which can be refilled at any time during a burn. If the burner is going into a grill/stove designed around the burner itself the pellet holder can be as large as needed. The pellet grill-heating element is essentially self-cleaning and wind resistant. Super-heated gasses along with any ash are passed into the grill by means of an exhaust chute and which becomes the adjustable heat source for the grill. This assembly can also be set up as a stand alone/self contained unit, which does not require an outside power source.

The advantage of the present invention is to provide the conveniences of a gas burner, with the flavor of a wood based fire. Having a starting time from one to three minutes, flavor, low cost (initial and running costs), short cooking times (no pre-heat required after flame is established) and it is not limited in its burn time as are charcoal or gas units. Pellets can be added at any time without any interruption in the cooking or cooking time.

These and other benefits of this invention will become clear from the following description by reference to the drawings.

BRIEF DESCRIPTION OF THE DRAWINGS

FIG. 3A is a perspective view showing the burner embodiment of FIG. 3 positioned within the pellet fired burner assembly of FIGS. 1 and 2;

FIG. 4 is a perspective view showing the components of a burner assembly of the invention;

FIG. 5 is a lateral view showing the burner assembly in use with a grill/stove;

FIG. 8 is a perspective view showing the upper portion of the assembly;

FIG. 9 is a lateral plan view showing a pellet holder cover structure;

FIG. 9A is lateral plan view showing a manual lighting tube;

FIG. 19 is a lateral view in section of the air nozzle assembly of FIG. 18;

FIG. 20 is a plan view of an alternate air nozzle assembly;

FIG. 21 is a perspective view showing the lower housing structure

FIG. 40 is a lateral view showing another primary air intake embodiment;

FIG. 41 is a lateral view showing another primary air intake embodiment;

FIG. 42 is a top view of the embodiment of FIG. 40;

FIG. 43 is a top view of the embodiment of FIG. 41;

FIG. 44 is a plan view showing a steam driven burner assembly;

FIG. 45 is a plan view showing an alternative pellet holder embodiment;

FIG. 46 is a plan view showing another pellet holder embodiment;

FIG. 47 is a plan view showing another pellet holder embodiment;

FIG. 47A is a lateral plan view showing a pellet holder and feeding embodiment;

FIG. 48 is a plan view showing a pellet fuel flow valve assembly;

FIG. 48A is a bottom view of the assembly of FIG. 48;

FIG. 49 is a plan view showing the pellet fuel valve assembly of FIG. 48 in a closed position;

FIG. 49A is a bottom view of the assembly of FIG. 49;

FIG. 50 is a plan view showing the fuel flow valve of FIG. 48 in use;

FIG. 51 is a plan view showing the fuel flow valve in use;

DESCRIPTION OF THE PREFERRED EMBODIMENTS

Figure 1:
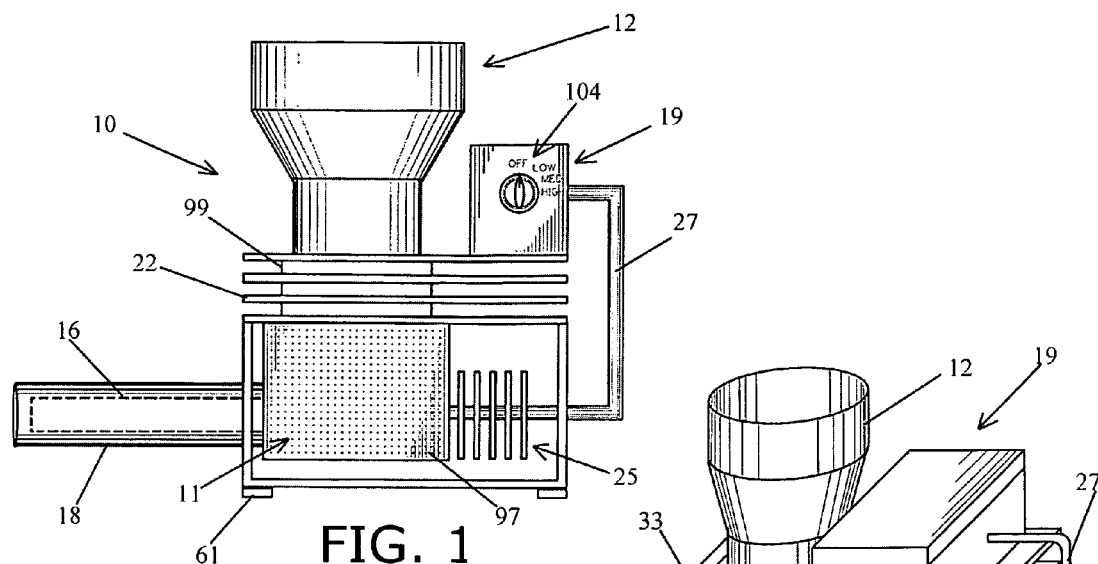
FIG. 1 is a lateral plan view showing a portable pellet fired burner assembly of the invention.
Figure 56:
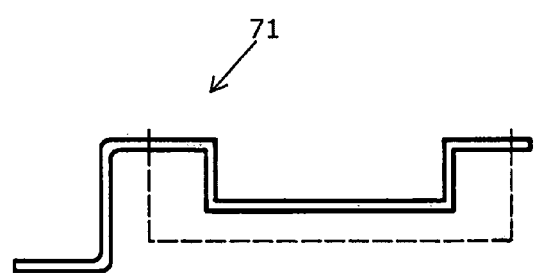
FIG. 56 is a lateral plan view showing a grate member structure used between the grate members of FIG. 55.

The pellet fired heating element assembly 10 of the invention, its components and uses are shown in FIGS. 1-56. Specifically, the heating element or burner assembly 10 is shown in FIGS. 1-7 and identifying the various components of the assembly. Further, the heating or burner assembly 10 is shown as a small, stand alone, portable unit and mountable for use to a grill/stove 23. Although the invention provides a basic, stand alone pellet burner assembly with legs 61, it provides components that may be incorporated into a plurality of heating assemblies that enhance the function and operation of the pellet burner.

FIGS. 8-11 show the upper section of the heating assembly of the invention. Specifically, the pellet holder 12, cooling plates 22, insulators 99, primary air intake 14, electric starter 52 and the primary air intake housing 97 are shown. FIGS. 12-21 show the lower section of the heating assembly 10 and specifically showing the burner body housing 11 having a bottom 55 for the decomposer grate assembly 28, the air nozzle assembly 25, the primary intake housing 97 constructed of a breathable, heat resistant material and including the electric circuit 30.

Figure 22:
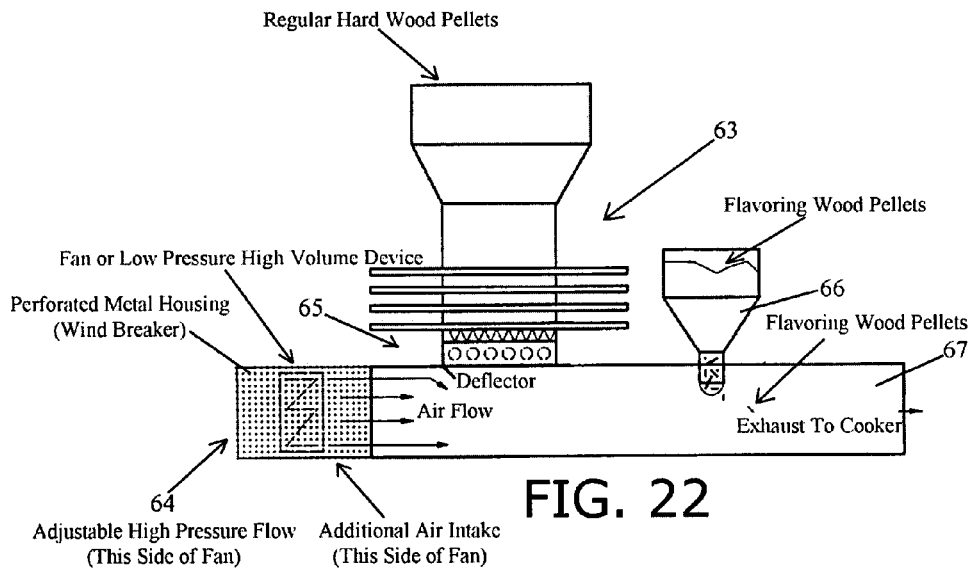
FIG. 22 is a lateral view showing an adjustable high pressure flow burner assembly with a wood flavor smoking aperture.
Figure 23:
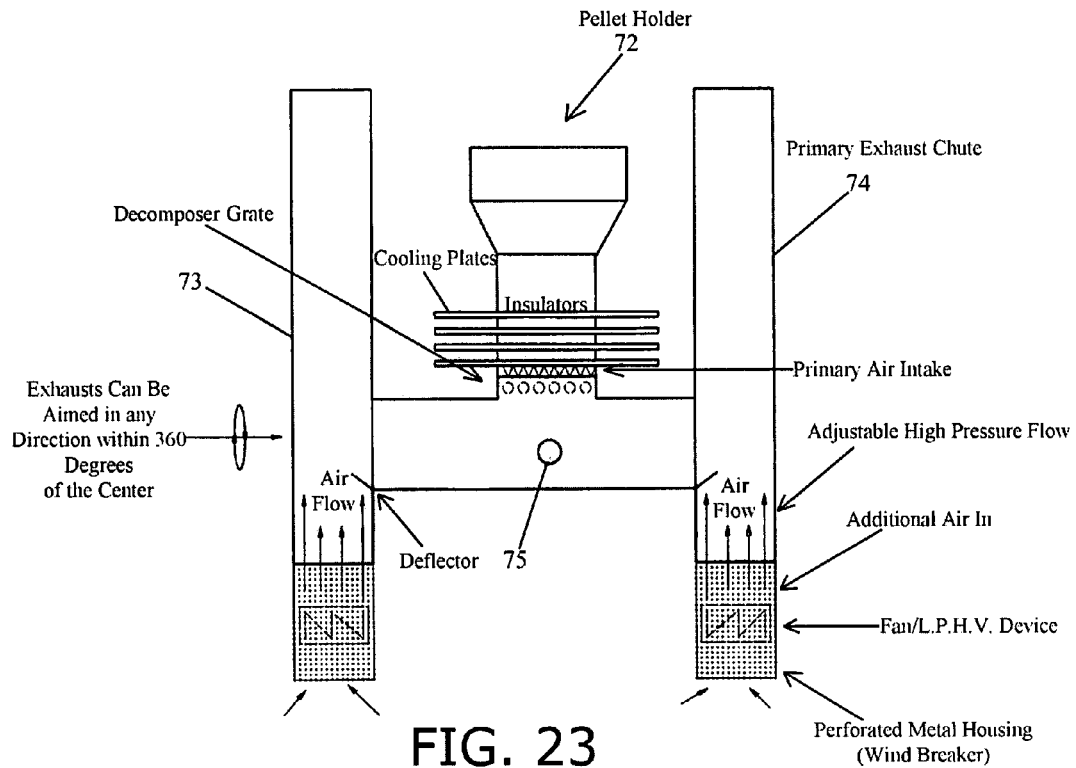
FIG. 23 is a plan view showing of a low pressure high volume burner with multiple primary exhaust chutes.
Figure 24:
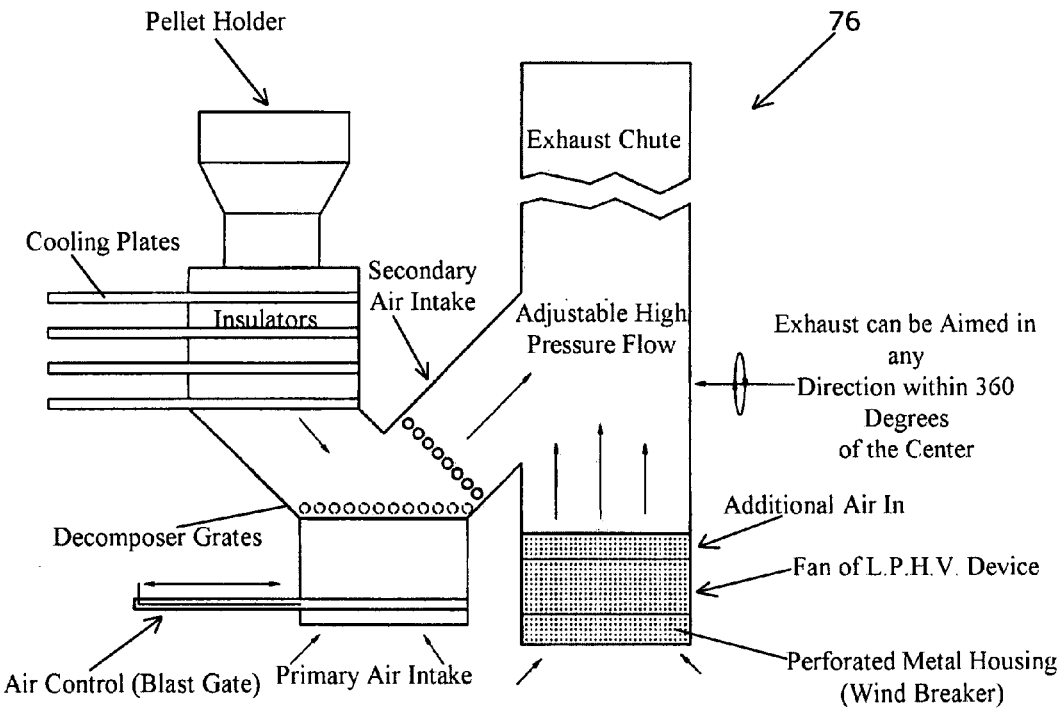
FIG. 24 is a lateral view showing a force drafting low pressure high volume burner assembly.
Figure 25:
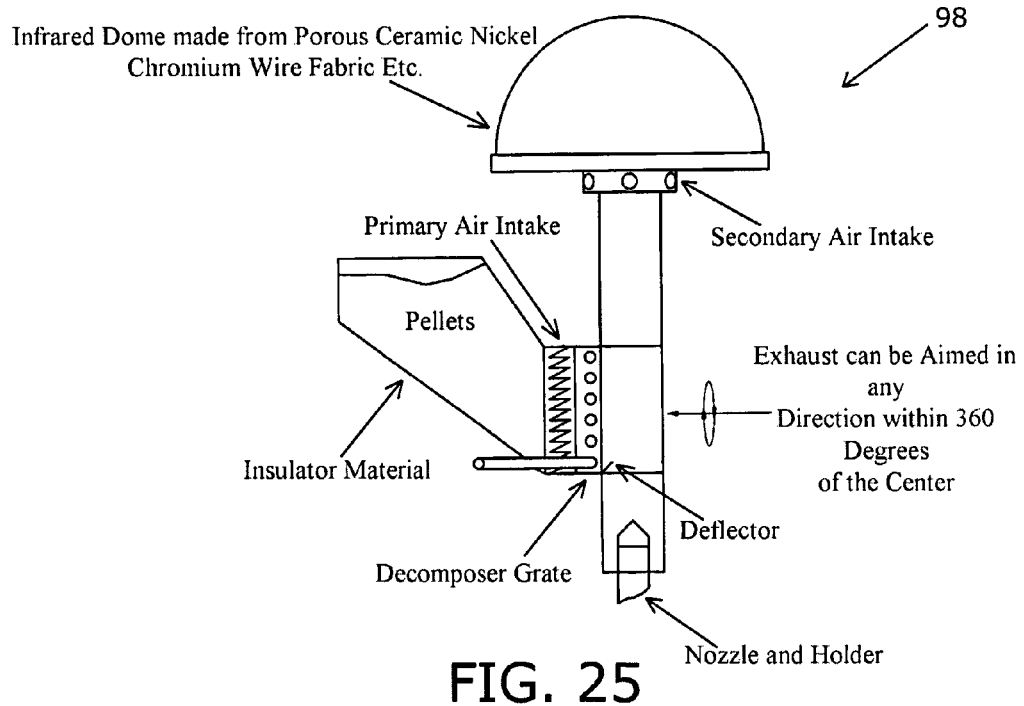
FIG. 25 is a lateral view showing an infrared dome burner assembly.
Figure 26:
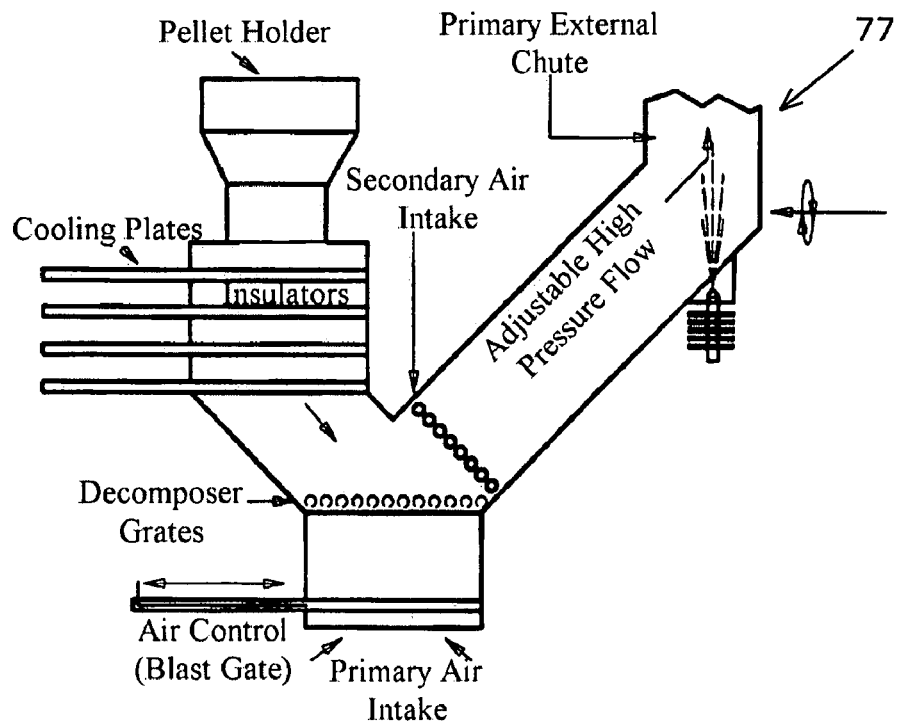
FIG. 26 is a lateral view of a high pressure low volume burner assembly.
Figure 27:
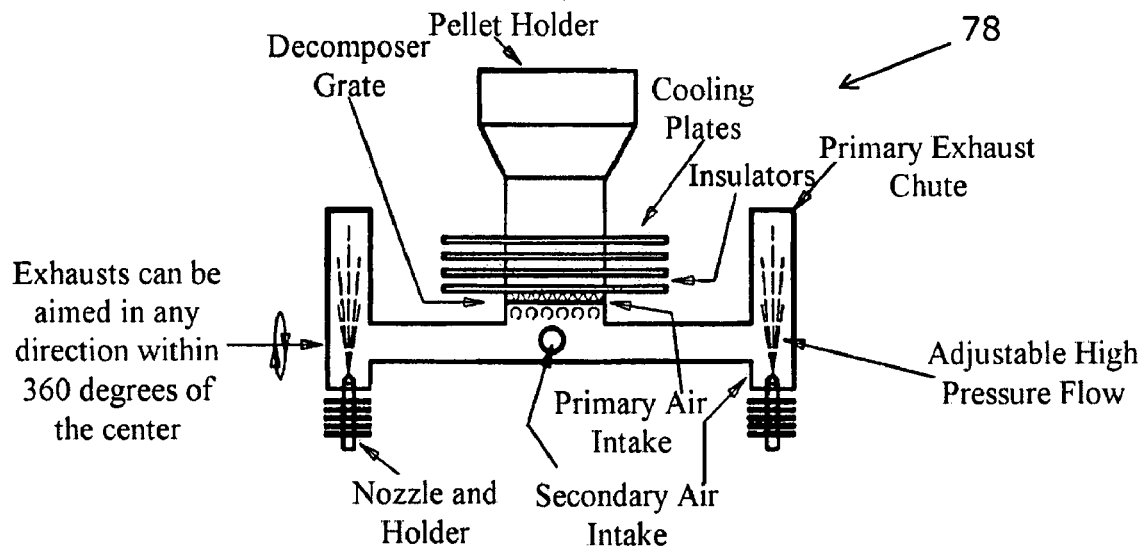
FIG. 27 is a lateral view of a high pressure low volume burner assembly having two primary exhaust chutes.
Figure 28:
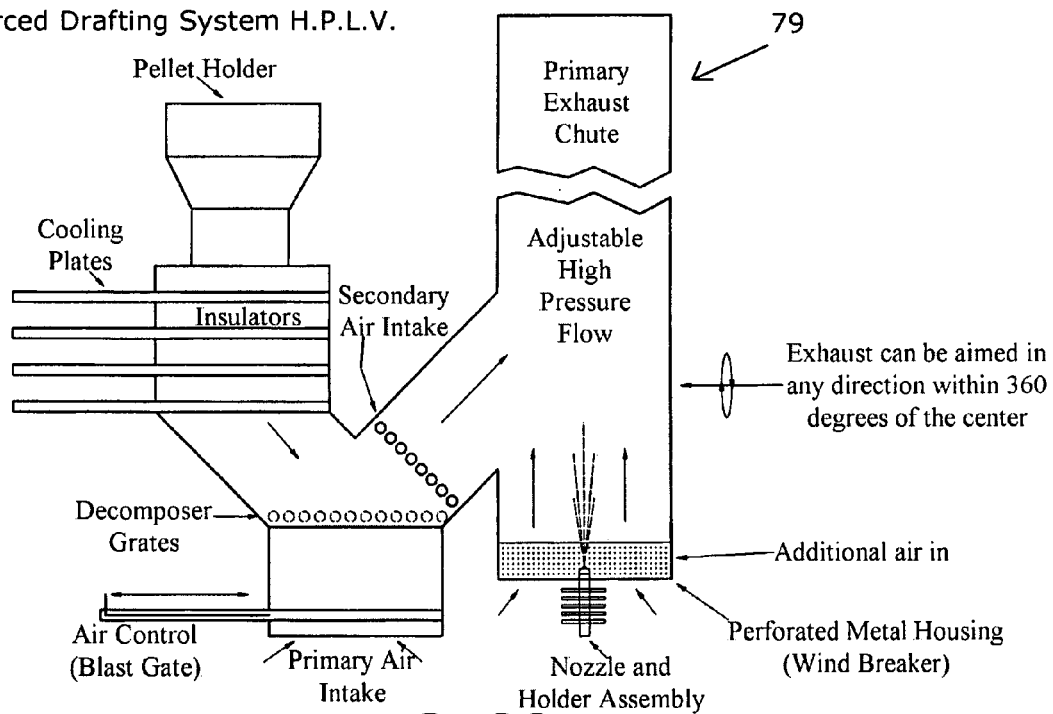
FIG. 28 is a lateral view of forced drafting high pressure low volume burner assembly.
Figure 29:
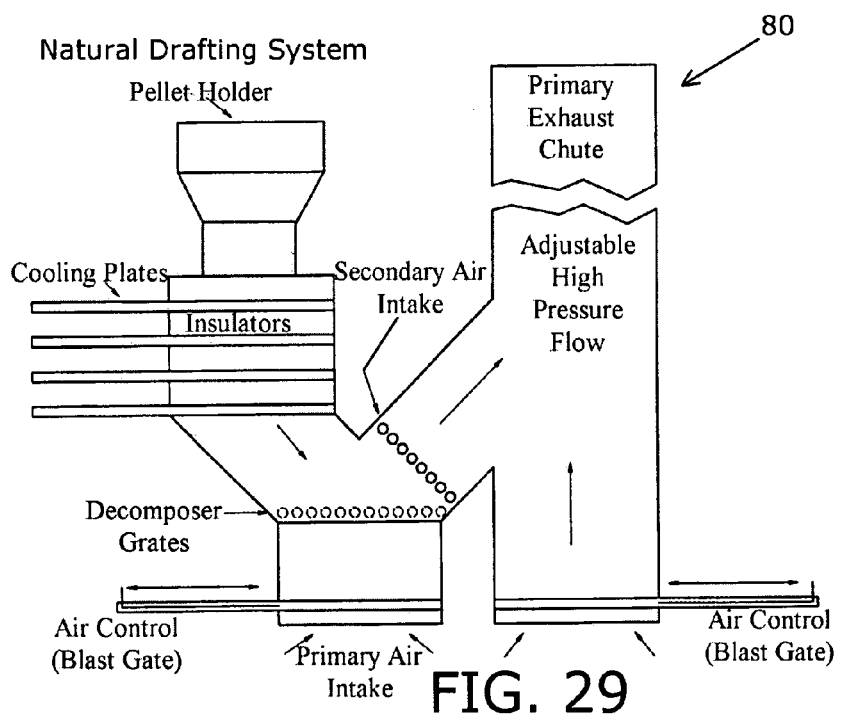
FIG. 29 is a lateral view of a natural drafting burner assembly.
Figure 30:
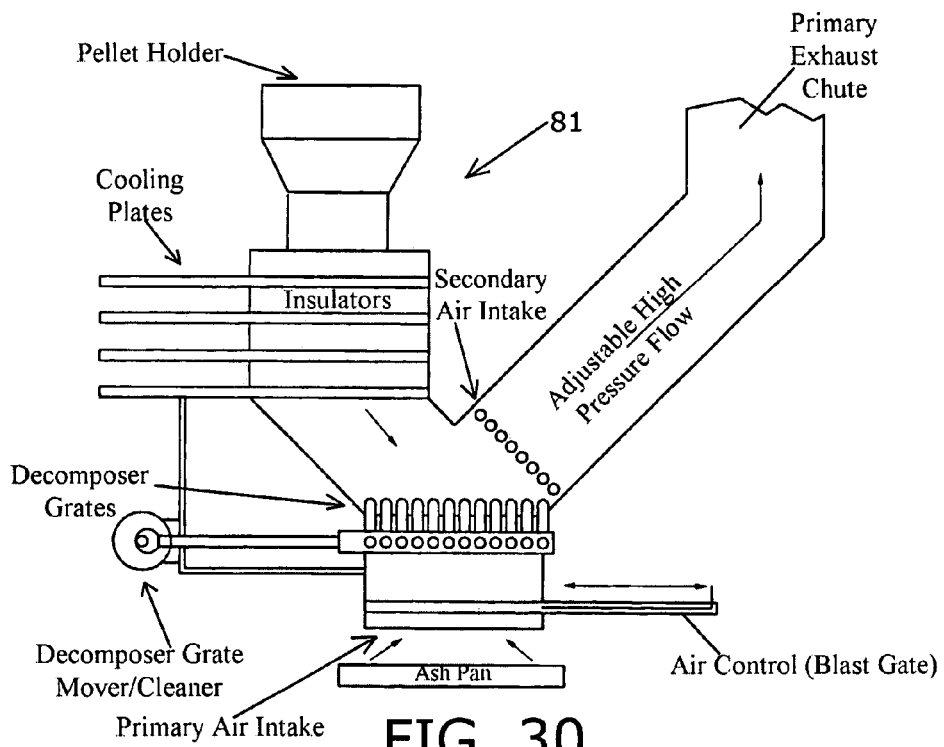
FIG. 30 is a lateral view of another natural drafting burner assembly.
Figure 31:
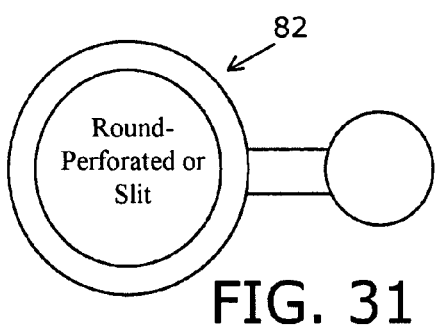
FIG. 31 is a top view showing an alternative primary exhaust embodiment.
Figure 33:
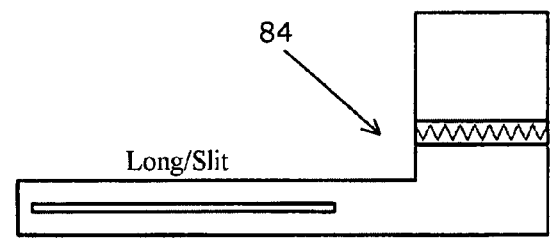
FIG. 33 is a lateral view showing another primary exhaust embodiment.
Figure 32:
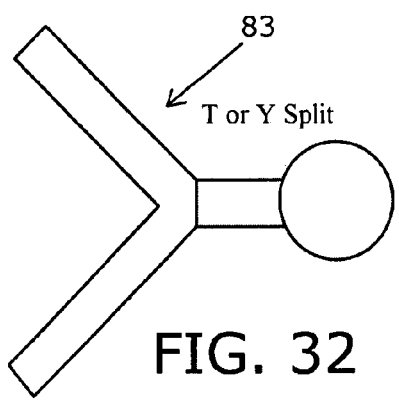
FIG. 32 is a top view showing another primary exhaust embodiment.
Figure 34:
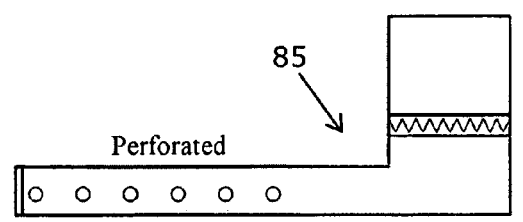
FIG. 34 is a lateral view showing another primary exhaust embodiment.
Figure 35:
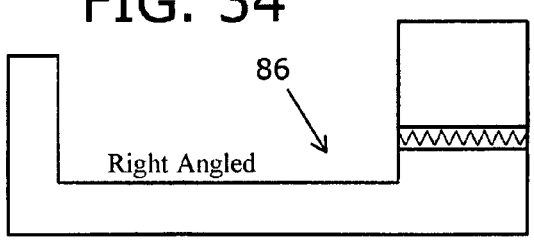
FIG. 35 is a lateral view showing another primary exhaust.
Figure 36:
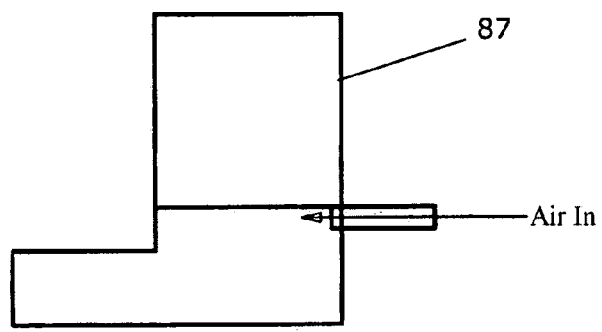
FIG. 36 is a lateral view showing an alternate primary air intake embodiment.
Figure 37:
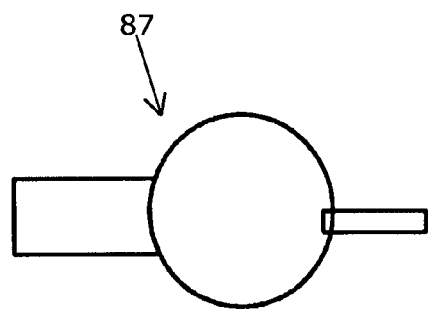
FIG. 37 is a top view showing the primary air intake FIG. 36.
Figure 38:
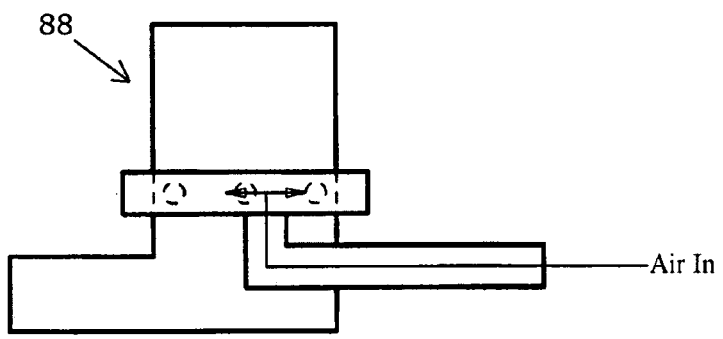
FIG. 38 is a lateral view showing another primary air intake of embodiment.
Figure 39:
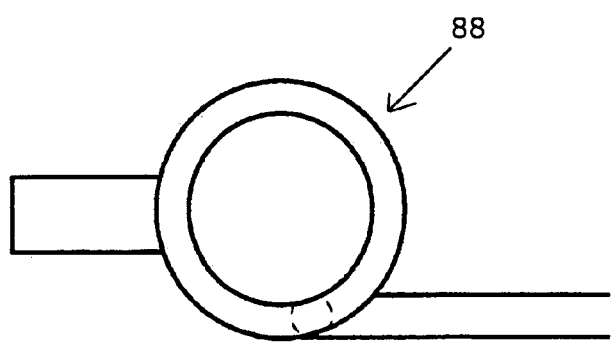
FIG. 39 is a top view showing the primary air intake of FIG. 38.
Figure 52:
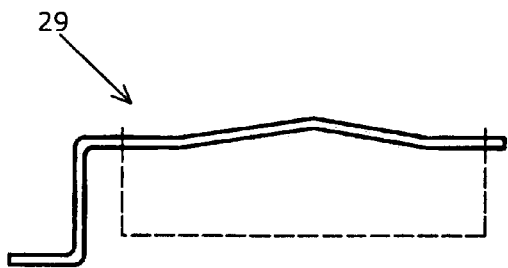
FIG. 52 is a lateral plan view showing a decomposer grate member.
Figure 53:
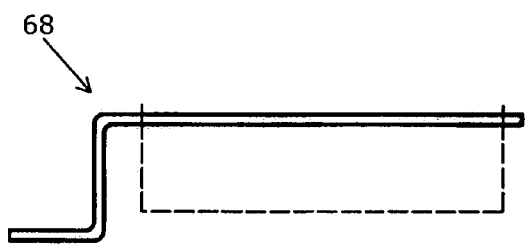
FIG. 53 is a lateral plan view showing another grate member.
Figure 54:
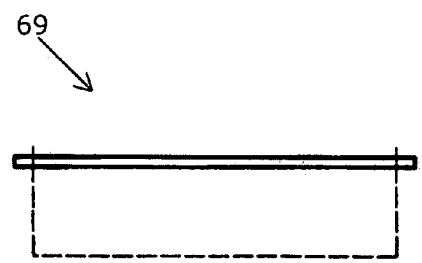
FIG. 54 is a lateral plan view showing another decomposer or rod grate member.
Figure 55:
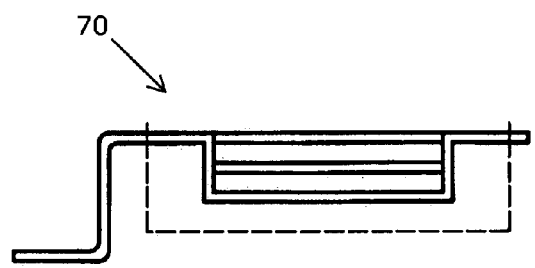
FIG. 55 is a lateral plan view showing a foremost and last grate member structure.

FIGS. 22-56 show various alternative burner assembly embodiments and related elements. Specifically, FIGS. 22-24 show forced drafting low pressure high volume burner assemblies which include an adjustable flow assembly with a smoking apparatus 63, high flow means 64, deflector 65, flavored pellets 66 and exhaust 67. Further shown are an assembly 72 with multiple primary exhaust chutes 73, 74 and a secondary air intake 75 and in FIG. 24 showing a force drafting embodiment 76. FIGS. 25-28 show forced drafting high pressure low volume burner assemblies which include the use of an infrared device embodiment 98, an embodiment 77, a burner with multiple primary exhaust chutes 78 and an embodiment 79. FIGS. 29-30 show two embodiments 80 and 81 comprising natural drafting burner assemblies. FIGS. 31-47 show alternative primary exhaust embodiments 82-86, alternative primary intakes 87-90, a steam driven burner assembly 91, alternative pellet holders and pellet feeders 92-95, and a manual lighting device in FIG. 45. Further shown in FIGS. 48-56 are a pelletized fuel flow valve 96 as well as alternative decomposer rods or grate members 29 and 68-71.

The operation of the heating element is described below by reference to the drawings and with respect to the various elements or components that make up the various burner assemblies. The pellet fired heating element assembly 10 for grilles and stoves is shown in FIGS. 1-7. The various elements of the assembly 10, namely the pellet holder 12, the insulators 99 and cooling plates 22, the primary intake 14, the burner, the secondary air intake, the air nozzle assembly 25 and nozzle holder, the decomposer grates 28, the automatic decomposer grate mover or cleaning structure, the breathable, heat retardant housing, the electrical enclosure and the supply of gas vapor will be discussed after the operation of the invention.

Operation of the Invention

This application uses the terms wood pellets or pelletized fuel, however, these terms are used generically and can also represent the following: wood pellets, pelletized fuel, small natural wood pieces, nuts and/or its shells, dried corn, acorns, seeds, pelletized biomass or paper and the like.

The pelletized fuel may be supplied to the pellet holder 12 of the tubular structure by various means such as via conveyer, ramp, held in bulk in a hopper, etc. From the pellet holder 12, gravity pulls the pellets down through the insulators onto the decomposer grates 29 located in the primary combustion area 13 of the structure.

The primary combustion area 13 is open in part to the atmosphere by means of the primary air intake 14. An exemplary primary combustion area of the primary air intake housing may be constructed of 16 AWG nickel chromium wire which is bent in a manner so as to be about ½ inch high to hold the charcoal inline with the natural pellet flow and to direct the charcoal to the rods or grate members 29 that make up the decomposer grate 28. Air passes through both components of the primary air intake 14 to form the primary combustion area 13.

An adjustable high pressure flow of gas or vapor 40 is introduced to the primary exhaust chute under the decomposer grate 28 to create a low pressure flow on the top of the grate due to this pressure differential means 17. This flow also creates a low pressure flow so that upon ignition, flames are pulled into the pellet mass on the grate. One or two layers of pellets may initially be placed onto the decomposer grate and then ignited by means of a small butane torch or by igniting a crumpled up piece of paper over the top of the pellets, for example. The low-pressure area will cause the flames to be pulled into the pellet mass partially igniting the pellet mass and creating smoke which is driven through the secondary combustion area 39 where air is added through the secondary air intake and out the exhaust chute 16. Within a few minutes, the smoke mixed with air from the secondary intake 54 will ignite and become flame. At this time the pellet holder is filled with pellets, which slows the rate of the downward airflow.

Under normal running or steady state conditions the air is chiefly brought in through the primary air intake 14, feeding oxygen to the pellets that have turned to hot charcoal and located in the primary combustion area and providing the pellet decomposing region 15. This air intake maintains a steady flow of wood gas to the secondary combustion area to maintain the flame and also helps to isolate the hot contents to this specific area. The super-heated gasses 38 along with any ash are passed into the grill by means of the primary exhaust chute 16, which becomes the adjustable heat source for the grill or stove, for example.

The pellet grill-heating element is essentially self-cleaning, however, after long slow burns, i.e., after 1.5 to 2 hours of use, ash will build up on the decomposer grates to diminish performance. Means are provided for movement of the decomposer grate bars, either manually or by means of an electrical/mechanical device, or by a burst of high pressure gas stream will disperse this ash build up. By running the heating element out of fuel shuts down the burner.

The burner housing body 11 shown in FIGS. 1-3 and 3A is a relatively small compact generally L-shaped structure with the primary exhaust 16 attached to the burner housing 11. The pellet burner assembly 10 is shown in FIGS. 1-3A to have a pellet holder 12 which feeds pellets through alternating cooling plates 22 and insulators 99 through primary intake 14 into burner housing 11 having grate assembly 28. The burner housing 11 has a primary exhaust chute 16 extending from one side. A perforated housing 97 having a secondary exhaust 18 is shown surrounding the burner housing 11 and primary exhaust chute 16. The burner housing body 11 is constructed of approx. 3×3 square inch tube, with a height of approx. 2.25 inches. A row 105 of seven-0.250 inch diameter×3.75 inch length ceramic decomposing rods are shown set equidistantly apart about 0.375 inches on their centers thereby providing about 0.490 inches of space between the rods 33 and the 3×3 inch cover plate 102, the cover having a 2.125 inch hole 103 through its center, and four additional ¼-20 threaded holes surrounding the center hole 103 through its center, and four additional ¼-20 threaded holes surrounding the center hole 103 (one in each corner of the cover) about 1.75 inches from the large hole center. These threaded holes support four ¼-20×3.5 inch length threaded rods 33. Each rod 33 is used to affix (sandwich) all the parts that are above the burner body 11. The primary intake 14 is set upon the cover 102 and the intake breathes from three of its four sides. The intake section facing the primary the exhaust tube 16 is not open to the atmosphere to thereby provide an even burn. The primary intake 14 is shown constructed of four 0.048 inch thick intake plates 100 with holes aligned with those of the cover plate 102. The first plate is spaced 0.048 inches from the cover by using washers 35 or the like on two of the threaded rods 33 (the two on the nozzle holder side) and the use of a spacer 34 also 0.048 inches thick connecting between the other two threaded rods 33 (the two in the exhaust side) to block air from entering the exhaust side. The two center intake plates 100 are spaced the same way away from one another. The top most plate 101 is similarly spaced from the intake plate and above which the alternating insulators 99 and cooling plates 22 are mounted. Other primary intake embodiments are discussed below.

Pellet Holder

The pellet holder 12 for pellets 45 are shown in FIGS. 9 and 9A (preferred embodiment) and FIGS. 45-47, show other pellet holder structures. The pellet holder structure of FIG. 9 shows a hopper with a spring loaded hinged cover 20, having a cover body 42, a spring hinge 41, a handle portion 43 and a fuel indicator 44. FIG. 46 shows a pellet holder that may be fed by such devices as, but not limited to, a chute, an auger, or conveyer, all of which are fed by a holding and funneling device such as a hopper. With the use of the pellet holder of FIG. 46 one may also desire to utilize the pelletized fuel flow valve 96 shown in FIGS. 48 and 49 which will control the flow of pellets to the burner. Another form of control may be the utilization of an electronic sensor to determine if the flow of fuel is required so as to control of the delivery devices referenced above. The holders of FIGS. 46 and 47 are further shown to have a flame arrester and a hinged flap door which are supplied to deal with a rare occurrence as will be described below with respect to FIGS. 45-46. FIG. 47 is simply a "feed as you need" system, which can include a cover to keep the pellets dry.

Insulators and Cooling Plates

Figure 2:
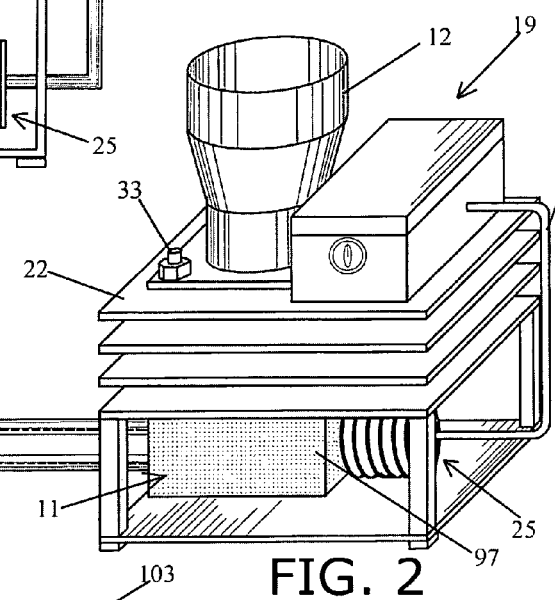
FIG. 2 is another perspective view of the assembly of FIG. 1.
Figure 3:
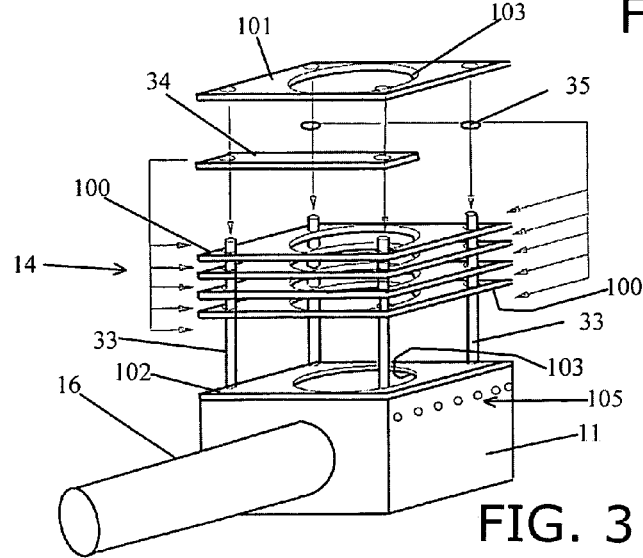
FIG. 3 is a perspective view showing an air intake and burner embodiment of the burner assembly of the invention.

Directly below the pellet holder 12 is the first of at least three cooling plates 22 alternating with insulators 99, as shown in FIGS. 1 and 2. Both the insulators 99 and the cooling plates 22 are shown to have a central hole or aperture through their axis with the hole in the cooling plate 36 being larger in size than that of the insulator thereby keeping heat from penetrating directly to the cooling plate. The cooling plates and insulators are stacked and affixed together alternating between the cooling plates and the insulator matching the hole centers as shown in FIG. 8.

Figure 6:
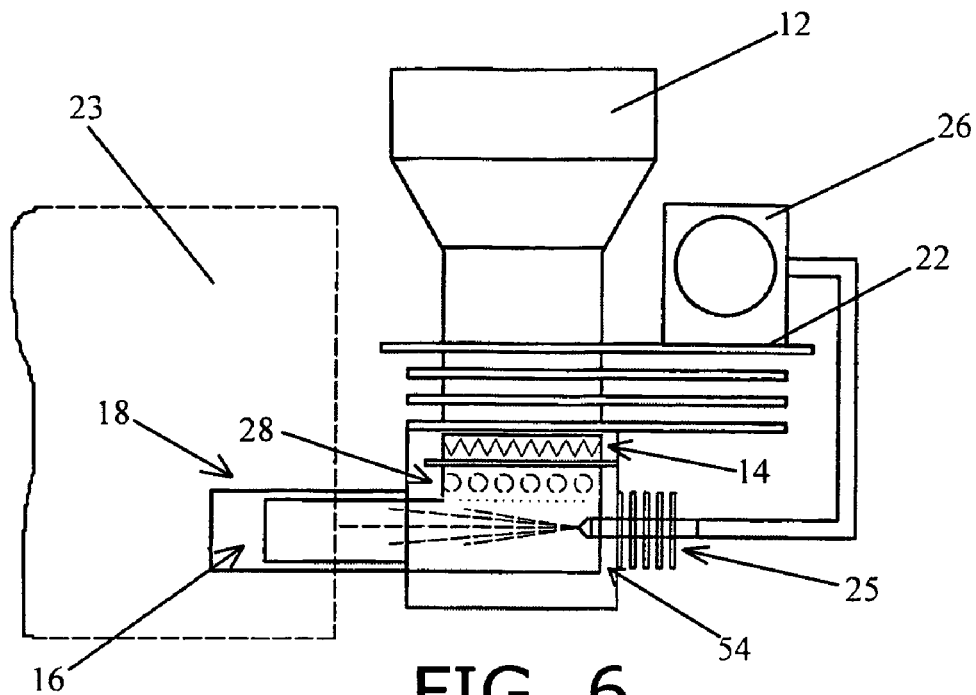
FIG. 6 is a lateral plan view showing the operational elements of the assembly of FIG. 5.

The cooling plates 22 are made up of, but not limited to, heat absorbing yet resilient material such as aluminum and extend outward laterally from each of the insulators 99, being of any conceivable shape and/or form. The purpose of the plates 22 is to absorb and disperse by means of convection any built up heat within the insulators 99. The insulators are made up of, but not limited to, a fiberous high heat resilient material such as silicon fiberboard or like materials. Keeping the hot areas hot and cool areas cool, the first or top most cooling plate can be a stand-alone plate as are the others, as shown in FIG. 6, or it may be incorporated with, or used as, a housing which can encompass the majority of the entire burner assembly as shown in FIG. 5.

Primary Air Intake

The primary air intake 14 is located between the alternating cooling plates 22 and insulators 99 and the burner assembly. One intake embodiment is discussed above with respect to FIG. 3. The primary air intake 14 is generally made up of two separate parts, one being the primary air intake housing 97 which is made up of a heat resilient material such as, but not limited to, nickel, stainless steel with a high nickel content or ceramic. It is opened in part to the atmosphere by means of perforations, which allows the flow of air into the primary combustion area, which maintains hot charcoal to provide a steady flow of wood gas to the secondary combustion area to maintain the flame. The primary air intake housing also acts as the secondary windbreaker and will house or surround the primary air intake electric starter mentioned below.

Figure 10:
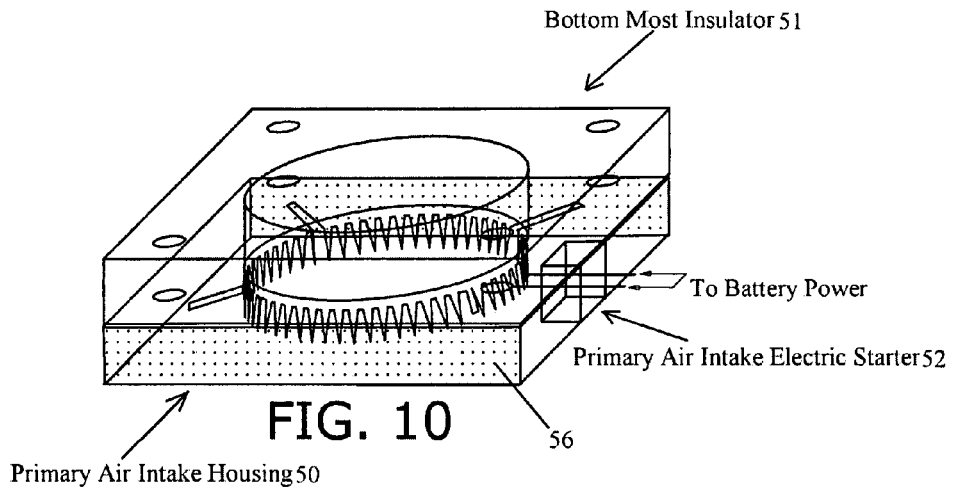
FIG. 10 is a perspective view showing the primary intake housing and bottom insulator of the assembly.
Figure 11:
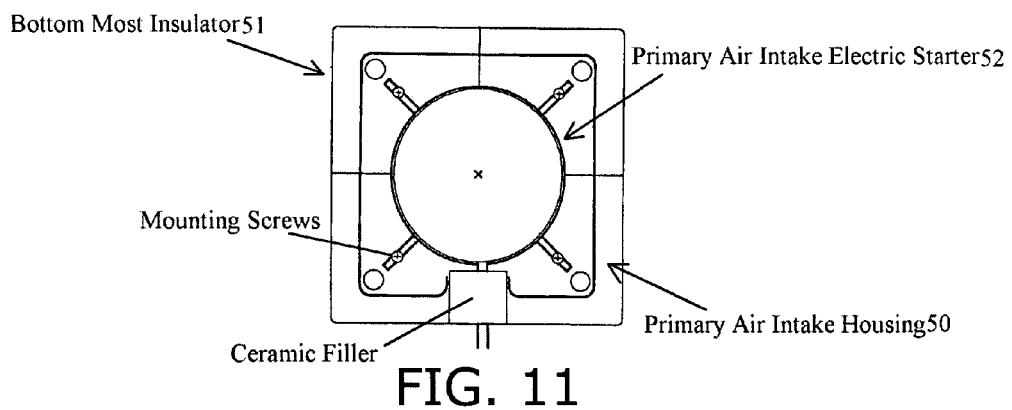
FIG. 11 is a bottom plan view of the assembly of FIG. 10.

As shown in FIGS. 10 and 11, the second part of the primary air intake may be the primary air intake electric starter 52 for starting the pellets, used when ample power is available. The primary air intake electric starter 52 is constructed of, but not limited to, 16 AWG nickel chromium wire which is bent from one continuous length in such a fashion as to be about ½" high. The primary intake electric starter holds the charcoal inline of the natural pellet flow, directs the charcoal to the rods 29 that make up the decomposer grate 28 and is housed within the primary air intake housing while allowing the air to pass through both components of the primary air intake, surrounding and becoming part of the primary combustion area. The primary air intake electric starter may be affixed to the bottom most insulator 51. The primary air intake housing will isolate the primary air intake electric starter so that it does not touch any metal parts that may short the system. The 12-volt negative is attached to one end of the primary air intake electric starter, the other to the positive, which can be controlled by a momentary switch located in the electrical enclosure, as shown in the electrical schematic 30 of FIG. 16.

When the switch is activated and held for a specified amount of time, with the gas or vapor running, the 12-volt starter will glow red, the intense heat will ignite the pellets, starting the burn process. There are alternative embodiments and methods to the primary air intake shown in FIGS. 36-43. Any one embodiment and/or a combination may be utilized.

Burner

Figure 12:
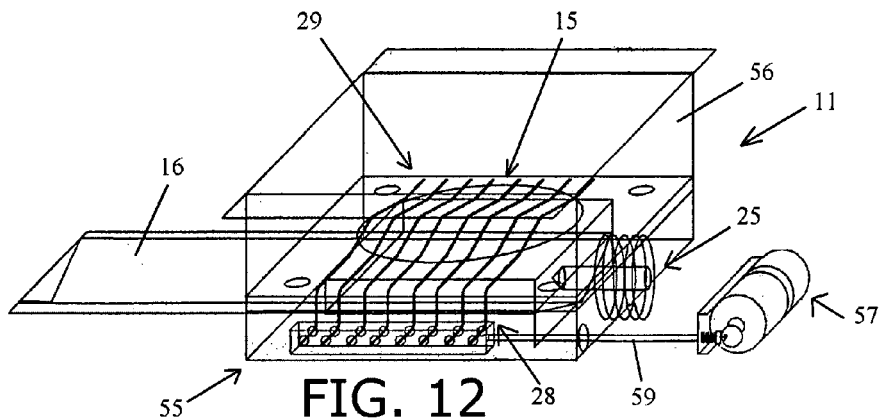
FIG. 12 is a perspective view of the elements in the lower housing assembly of the burner assembly.

The burner housing 11 is made up of a heat resistant material such as, but not limited to, nickel, stainless steel with a high nickel content, cast metal or ceramic. The burner is of a generally tubular design and can be fabricated from sheet metal or tubing. As shown in FIG. 12, the burner utilizes a generally V-shaped bottom which provides self-cleaning. The burner also utilizes a downdraft or down-updraft system, the fuel is gravity fed vertically into the grate 28 of the burner and exhausts out the primary exhaust chute 16, which is at a generally right angle of the fuel feed.

Figure 7:
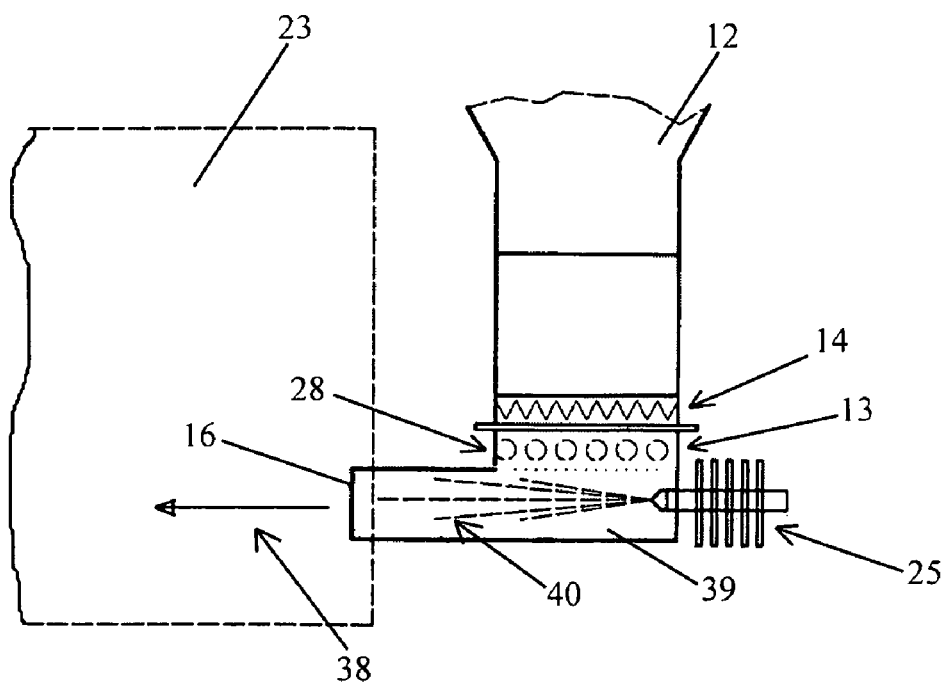
FIG. 7 is a cutaway view showing the burning process in the burner assembly.

The burner housing 11 is relatively small in comparison to prior art devices, it is utilized to decompose the pelletized fuel into heat/ash and direct the heat/ash out the burner's primary exhaust chute 16 and into the stove/grill by means of an adjustable high-pressure flow of gas or vapor which is introduced to the primary exhaust chute, as shown in FIGS. 6 and 7, for example.

As further shown in FIG. 7, the high pressure flow is below the decomposer grate 28 to create a low pressure flow on the top side of the grate, which also creates a low pressure flow to the tubular assembly structure which is made up of the pellet holder and primary combustion area so that upon ignition, flames are pulled into the pellet mass on the decomposer grate 28.

During operation, air from the primary air intake maintains hot charcoal in the primary combustion area to provide a steady flow of wood gas with air being added via the secondary air intake. For cleaning purposes, an electrical/mechanical device may be provided to move the decomposer grate or to provide a sudden burst of high gas vapor pressure.

Secondary Air Intake

Figure 13:
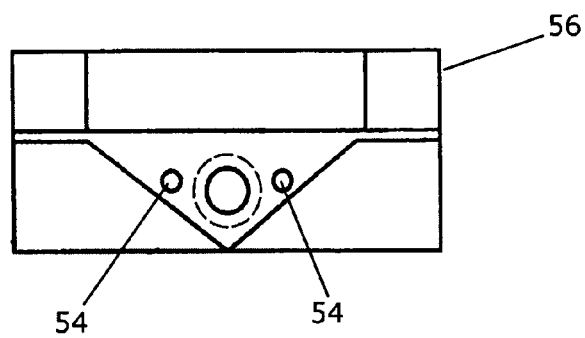
FIG. 13 is a back view of the housing of FIG. 12.

As shown in FIG. 13, the secondary air intake may simply comprise two ⅛ inch holes 54 drilled through the backside of the burner housing 11 and having one hole on either side of the mounting area of the nozzle holder. These holes allow air to enter into the secondary combustion area to nearly complete the combustion of the wood gas. There are other methods to the design and use of the secondary air intake, which will become apparent with respect to FIGS. 22-30.

Nozzle and Nozzle Holder

Figure 18:
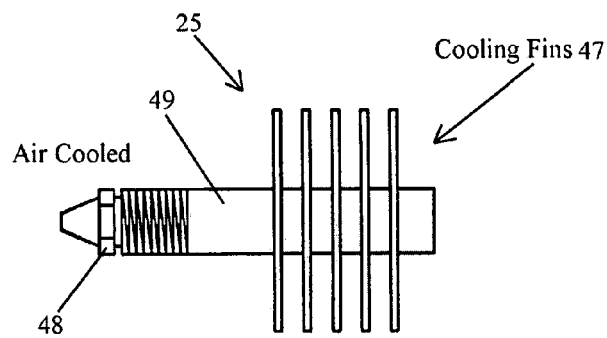
FIG. 18 is a lateral view of an air nozzle assembly.

The nozzle and nozzle holder assembly 25 are made up of a high heat resilient tubular material such as, but not limited to, nickel, stainless steel with a high nickel content or ceramic. As shown in FIGS. 18-20, the nozzle end 48 is affixed to the nozzle body or holder 49 and both are affixed so that the nozzle 48 protrudes through the backside and into the interior of the burner housing just below the decomposer grate and aimed so that the gas vapor stream 40 goes directly out the primary exhaust chute (FIG. 7). The nozzle holder body 49 preferably has cooling capabilities, i.e., cooling fins 47, heat sink 53, or the like. The size of the orifice in the nozzle 48 will depend on the pump being used. A high pressure nozzle will use a small orifice whereas a lower pressure nozzle will use a larger orifice.

Decomposer Grates

The decomposer grates are made up of a heat resilient material such as, but not limited to nickel chromium, nickel, cast metal or ceramic. The decomposer grates are made from approximately ⅛" rod which are equally spaced within the burner running perpendicular and just above the gas vapor nozzle as shown in FIG. 12 and are spaced approximately 0.230 inches on their centers.

Figure 12A:
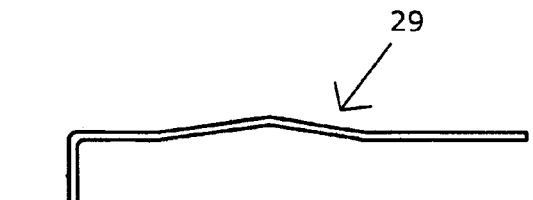
FIG. 12A is a lateral plan view of a decomposition rod or grate member.

As shown in FIGS. 4 and 12, the foremost and last most rods or grate members are approximately 0.184 inches on its center and are located away from the inner sidewalls of the burner body. The rods protrude outward through one of the opposite walls. On one end approximately one inch outside of the burner, the rod will be captured so that the rod cannot return back through the hole and yet the rod may partly rotate. As shown in FIG. 12A, the other end of the rod is of a crank design having two 90-degree bends protruding through one of the opposite walls outward approximately ⅝ inches, downwardly approximately ¾ inches and outward approximately ½ inch. This side also is captured just outside the burner wall.

Figure 14:
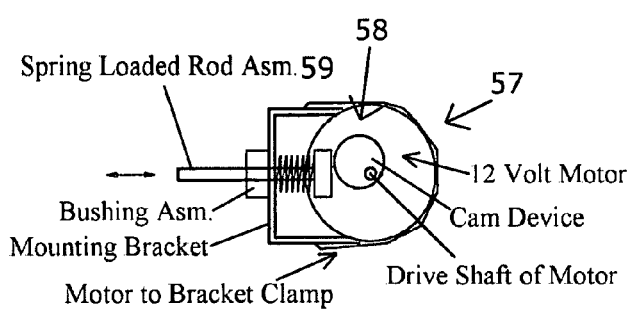
FIG. 14 is an end view of a motor assembly for the grate cleaner of the assembly.
Figure 16:
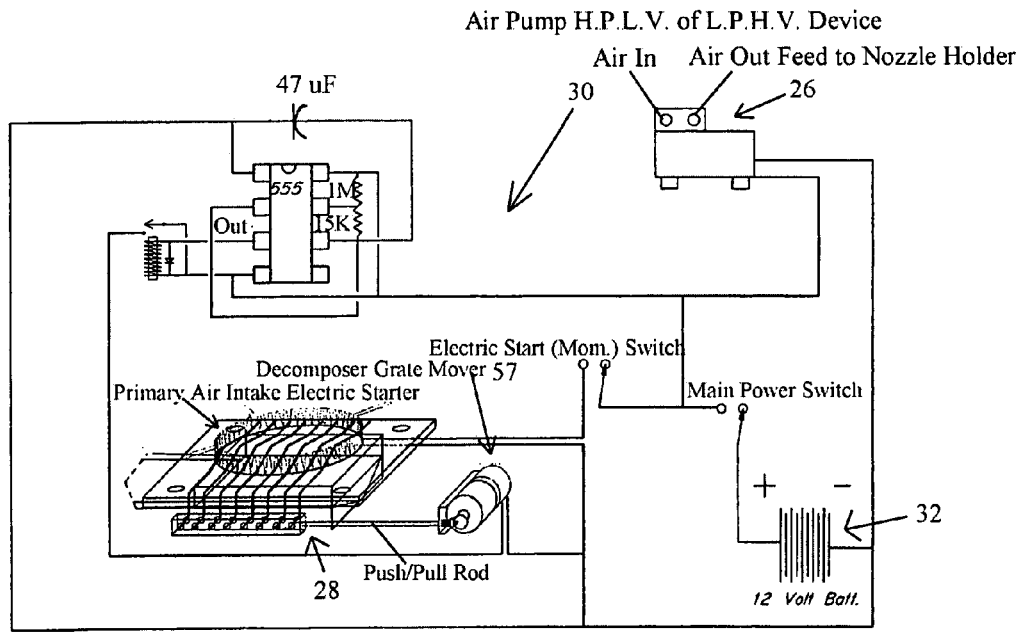
FIG. 16 is a schematic showing the electric circuit of the assembly.
Figure 17:
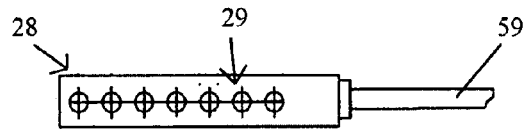
FIG. 17 is a lateral view of a grate mover structure

As shown in FIG. 17, the end of the rod 29 will be fitted with, but not limited to, an approximately ⅜ inch thick bracket 28, the bracket having holes slightly larger than the rod diameter. The bracket will have one hole for each decomposer rod being used. The holes are equally space approximately 0.230 inches on their centers. The bracket will be fitted to the end of the crank shaped rod and captured so the bracket will not come off the rod ends. FIGS. 14 and 16 show a receiving area for the push/pull rod 59 connecting the automatic decomposer grate mover/cleaner and the decomposer grate bracket 28. The bracket 28 may be utilized for movement of the decomposer grates, for cleaning purposes. While the bracket is being pushed or pulled, all of the decomposer grates move at the same time and the same rate. The decomposer grates are of an inverted V-shape at the center of the burner, which will give the moving grate more active motion, as shown in FIG. 16. There are other methods to the design and use of the decomposer grates, which will become apparent with respect to the alternative burner assemblies shown in FIGS. 52-56.

Automatic Decomposer Grate Mover/Cleaner

The automatic decomposer grate mover/cleaner may consist of any number of different configurations, one being the utilization of a solenoid, another may use the vibration of another component on board the burner assembly, however the preferred method is to create a fast back and forth movement from a cam.

Figure 15:
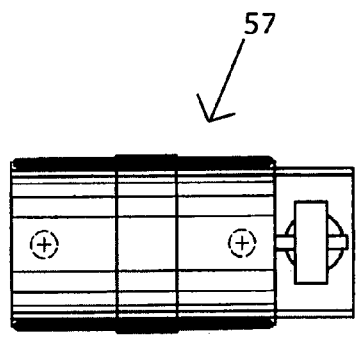
FIG. 15 is a top view of the motor assembly of FIG. 14.

The cam, which is driven by a small 12-volt motor 57, as shown in FIGS. 14-16, is able to come in contact with a spring loaded shaft that drives the bracket connecting the decomposer grates together, moving and cleaning the built up ash off the decomposer grates and sending the ash out to the grill. The automatic decomposer grate mover/cleaner is to be set on a timer that may be set to preferred increments, preferably with a timing of 30 seconds off, one second on.

The timing is on a repeated basis while the burner is in operation. The timing can be controlled by different means as well. The preferred method shown in FIG. 16 is a 555 integrated circuit set as a basic astable circuit and the use of a low current draw relay connecting the 12-volt motor to the battery power 32 on demand.

Breathable, Heat Resistent Housing

A perforated breathable, heat resistant housing 97 consists of a bottom and four outer sidewalls, shown in FIGS. 1, 2, 5 and 21 which are open in part to the atmosphere. The housing contains the primary air intake 14, the decomposer grate assembly 28 and most of the burner. The housing has an opening 60 and is affixed to the underside of the bottom most cooling plate. The secondary exhaust 18 is shown extending from perforated housing 97 and surrounding the primary exhaust 16.

The housing 97 is made from such material as, but not limited to, a perforated metal with cutouts for necessary components to exit and enter into and out of the housing. As shown, the housing has aperture 60 for a secondary exhaust chute to be affixed and for extending outward from one of the outer walls of the housing. The secondary exhaust chute 18 as shown in FIG. 6 houses, surrounds and extends outwardly beyond the length of the primary exhaust chute 16.

The space between the outer surface of the primary exhaust chute 16 and the inner surface of the secondary exhaust chute 18 provides a low pressure area inside the breathable, heat retardant housing, which draws cooling air through the housing to cool the housing and the burner assembly as the air exits out of the secondary exhaust chute, thus supplying any needed oxygen to the final flame as it exits the primary exhaust chute and enters the stove/grill. This provides full and complete combustion of the fuel vapor. The housing also acts as a primary windbreaker for the primary air intake.

Electrical Enclosure

An electrical enclosure 19 (FIGS. 1 and 2) is included to house the primary on/off switch if used, the switch for the 12-volt starter if used, the heat adjustment control 104 and the automatic decomposer grate mover/cleaner assembly and timer/relay assembly.

Generating and/or Supplying Adjustable Gas Vapor

Many different gases or vapors may be used for the high-pressure low volume method, i.e., pumped air, air contained under pressure, $CO_2$ contained under pressure. Non-flammable or flammable gases contained under pressure may also be used. The method utilizes the heat from the burner's primary exhaust chute 16 to heat water and create steam to drive the burner will also work, as shown in FIG. 44.

The adjustable gas flow (control knob 104) may be supplied via hose or tubing 27 to the nozzle holder and nozzle assembly 25, which in turn creates the low-pressure area needed to run the burner assembly. As different gases or vapors are utilized, depending on the characteristics of the gas or vapor, the secondary air intake will need to be adjusted to suit each different circumstance. For example, propane may be used as the adjustable gas flow in the preferred embodiment of burners. This would mean that the secondary air intake is comprised of two ⅛ inch holes designed to burn clean when air is utilized as the gas flow.

Using propane, however, will create an enriched fuel mixture, resulting in wood gas being pushed out of the primary exhaust. On a grill, this may be used as a heated smoking device, or fitting a natural gas type burner, to the end of the primary exhaust, and lighting the natural gas type burner itself will show how versatile wood gas can be. If, however, a normal clean burn is desired, then the secondary air intake will have to be enlarged to compensate for the rich mixture.

Another example uses an inert gas or vapor as the gas flow if no air is being supplied to the secondary air intake, one may capture and store via a compressor the wood gas which may be accessed at a later time and/or used as a manufactured gas to power a vehicle or the like.

The pellet fired heating element assembly of the present invention is discussed for use with grilles and stoves, however, the heating assembly may be utilized in other settings and for other purposes. For example, the teachings of this heating assembly invention may also be utilized as an outdoor space heater, an oven, grill, smoker, camp stove, orchard heater, kiln, metal melting pot, emergency heater, i.e., kept in the trunk of an automobile, and other heat requiring purposes. The teachings of the present invention have uses in many fields of operation due to its size, simplicity, efficiency and its use of fuel in solid form, thereby making it easy to handle and to replenish with a low cost fuel.

Other methods may use a low-pressure high volume device such as, but not limited to, a fan which may provide the adjustable high-pressure gas flow needed to run the burner, as shown in FIGS. 22-24. Another method utilizes natural drafting as shown in FIGS. 28 and 29. The natural drafting system utilizes a novel pellet delivery system. The delivery system uses a natural gravity pellet flow and by keeping the pellets encapsulated throughout the delivery process, uniform delivery and a uniform burn provides a stable flame front.

The preferred embodiment utilizes a small, yet powerful 12-volt air pump 26 which may be mounted on the top most cooling plate or housing which can encompass the majority of the entire burner assembly, shown in FIG. 5. The airflow from the 12-volt pump may be adjustable in the following ways: 1) the use of a pressure regulator, 2) a rheostat, resisting the voltage to the motor to slow airflow, 3) utilizing a needle and seat to create an air leak, 4) pulsating the energy to the air pump, or pulsating the air stream itself, will also make the airflow adjustable.

High Pressure Flow

There is a concern in the art that the high-pressure flow may be interrupted while lighting the burner manually or just before the pellets are depleted whereby flames may shoot up and out of the top of an "open hopper", whether the lid is open or off. Although such event may be a rare occurrence, there are safe guards that may be taken. A user needs to be aware of and understand that one should never put their face or allow anything else, and only the lid itself, over the top of an "open hopper". There are a number of different designs that may protect against such rare occurrence (see FIGS. 45-47 which show alternative burner assemblies). Under normal running conditions, other than those mentioned above with the lid opened or closed, if the high-pressure flow is interrupted, the burner will simply smoke until it snuffs itself out.

With respect to the above description, it is to be realized that the optimum dimensional relationships for the parts of the invention which include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As many changes are possible to the pellet burning heating assembly of this invention, utilizing the teachings thereof, the description above and the accompanying drawings should be interpreted in the illustrative and not the limited sense.

That which is claimed is:

1. A pellet fired heating assembly comprising:
    a) a funnel shaped pellet holder structure having an open top and a bottom opening for gravity feeding pellets;
    b) an alternating cooling plate and insulator structure having a central opening aligned with said bottom opening of said funnel shaped pellet holder;
    c) a plurality of spaced air intake plates having openings therebetween forming a primary air intake area, said plurality of air intake plates having a central opening aligned with said bottom opening of said pellet holder;
    d) a burner housing assembly having a top with an opening, a bottom and side walls and communicating with said spaced intake plates and being positioned below and aligned with said bottom opening of said pellet holder structure, said burner housing assembly having a decomposer grate assembly therein for receiving the gravity fed pellets through said central opening of said spaced intake plates and providing a primary combustion area for burning the pellets;
    e) an exhaust chute extending from a side wall of said burner housing, said exhaust chute being spacially below said decomposer grate assembly; and
    f) an adjustable nozzle assembly for the pressurized flow of gas or vapor introduced to said burner housing assembly from a side wall spacially below said decomposer grate and opposite the side wall from which said exhaust chute extends to provide a pressure differential across said decomposer grate and to provide a stream of heated air flow from said exhaust chute.

2. The pellet fired heating assembly of claim 1, wherein a perforated housing surrounds said burner housing assembly and said primary air intake area, said perforated housing having a secondary exhaust chute surrounding said exhaust chute of said burner housing.

3. The pellet fired heating assembly of claim 1, wherein said burner housing assembly has at least one aperture through a sidewall to provide a secondary air intake.

4. The pellet fired heating assembly of claim 1, wherein an electrical enclosure is mounted to said unitary burner housing and wherein power means are provided in said electrical enclosure and wherein cleaning means are provided for said decomposer grate assembly, said gas or vapor pressure source and said tubular exhaust portion and further wherein a heating element is provided above said decomposer grate assembly in said burner housing assembly.

5. The pellet fired heating assembly of claim 1, wherein a cover member is provided for said open top of said funnel shaped pellet holder.

6. A portable pellet fired heating assembly for grilles and stoves comprising:
    a) a burner assembly having a burner housing with a grate structure therein to provide a primary combustion area, said burner assembly having a top opening and having alternating spaced plates forming a primary air intake communicating with said primary combustion area and a plurality of cooling plates with aligned central openings extending upward from said alternating spaced plates;

b) a pellet holder having an open top and a funnel body with a bottom opening in communication with said central opening of said cooling plates; and c) an exhaust chute extending from said burner housing below said grate structure, means to provide a pressurized flow of gas or vapor through said burner housing and into said exhaust chute to thereby provide a stream of heated air flow through said exhaust chute for use in grilles and stoves.

7. The portable pellet fired heating element of claim 6, wherein a perforated housing surrounds said burner housing and said primary air intake, said perforated housing having a secondary exhaust chute surrounding said exhaust chute of said burner housing and wherein said secondary exhaust chute is a tubular structure having an end for communicating with a grill or stove.

8. The portable pellet fired heating element of claim 6, wherein said means to provide a pressurized flow of gas or vapor comprises an air nozzle assembly, a pump and an air supply line.

9. The portable pellet fired heating element of claim 6, wherein said cooling plates are spatially aligned and wherein insulators are interposed between said cooling plates.

10. The portable pellet fired heating element of claim 6, wherein said decomposer grate comprises a plurality of elongated grate members, each having a formed configuration.

11. The portable pellet fired heating element of claim 6, wherein an electrical enclosure is provided and wherein an air pump, a motor and an electrical circuit are contained within said electrical enclosure.

12. The portable pellet fired heating element of claim 6, wherein a secondary air intake is provided through said housing of said burner assembly below said decomposer grate.

13. The portable pellet fired heating element of claim 7, wherein cooling fins are provided on said air nozzle assembly.

14. The portable pellet fired heating element of claim 6, wherein said pellet holder has a hinged cover for said open top and wherein battery power is provided and wherein said primary air intake includes an electric starter.

15. A unitary pellet burner assembly comprising:

a) a generally rectangular burner housing having a top, bottom and sides, said burner housing having a grate structure therein, an opening through said top above said grate structure and an exhaust chute extending outwardly from one side of said housing below said grate structure;

b) a plurality of spaced plates having centrally disposed openings therethrough, said spaced plates mounted between said opening of said burner housing, said spaced plates having openings therebetween to form a primary air intake;

c) a pellet holder having an open top and open bottom mounted above said spaced plates forming said primary air intake, said open bottom of said pellet holder being aligned with said centrally disposed openings of said spaced plates; and d) a gas or vapor pressure nozzle assembly mounted to said burner housing below said grate structure and directed in general alignment with said exhaust chute to provide a pressure differential across said grate structure.

16. The unitary pellet burner assembly of claim 15, wherein a perforated housing surrounds said burner housing and said spaced plates forming said primary air intake, said perforated housing having a secondary exhaust chute surrounding said exhaust chute of said burner housing.

17. The unitary pellet burner assembly of claim 15, wherein said gas or vapor pressure nozzle assembly is adjustable and includes an air nozzle assembly, an air pump and an air supply line and wherein cleaning means are provided for said grate assembly and said gas or vapor pressure source.

18. The unitary pellet burner assembly of claim 15, wherein said assembly further has a plurality of alternating insulator and cooling plate members having centrally disposed openings therethrough and mounted between said plurality of spaced plates forming said primary air intake and said open bottom of said pellet holder.

19. The unitary pellet burner assembly of claim 17, wherein said grate assembly comprises a plurality of spaced, elongated grate members, each having a specified configuration and wherein an electrical enclosure is provided and wherein said air pump, a motor and an electrical circuit are contained in said electrical enclosure.

20. The unitary pellet burner assembly of claim 17, wherein said air nozzle assembly has cooling fins, wherein said pellet holder has a hinged cover for said open top, wherein battery power is provided and wherein an electric starter is provided above said grate assembly in said burner housing.

* * * * *